United States Patent
Brewer et al.

(10) Patent No.: US 10,529,131 B2
(45) Date of Patent: Jan. 7, 2020

(54) SIMULATING FRACTURED RESERVOIRS USING MULTIPLE MESHES

(71) Applicant: HALLIBURTON ENERGY SERVICES INC., Houston, TX (US)

(72) Inventors: Michael L. Brewer, Katy, TX (US); Steven B. Ward, Austin, TX (US); Dominic Camilleri, Houston, TX (US); Gerrick O. Bivins, Fulshear, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 27 days.

(21) Appl. No.: 15/750,783

(22) PCT Filed: Sep. 24, 2015

(86) PCT No.: PCT/US2015/051836
§ 371 (c)(1),
(2) Date: Feb. 6, 2018

(87) PCT Pub. No.: WO2017/052543
PCT Pub. Date: Mar. 30, 2017

(65) Prior Publication Data
US 2018/0232950 A1 Aug. 16, 2018

(51) Int. Cl.
*G06T 17/20* (2006.01)
*G01V 99/00* (2009.01)
(Continued)

(52) U.S. Cl.
CPC .......... *G06T 17/205* (2013.01); *G01V 99/005* (2013.01); *G06F 17/175* (2013.01); *G06T 17/05* (2013.01); *G01V 2210/646* (2013.01)

(58) Field of Classification Search
None
See application file for complete search history.

(56) References Cited

U.S. PATENT DOCUMENTS

2006/0025976 A1   2/2006  Kennon et al.
2009/0248374 A1  10/2009  Huang et al.
(Continued)

FOREIGN PATENT DOCUMENTS

FR         2870621 A1     11/2005
WO   WO-2012096911 A2      7/2012
(Continued)

OTHER PUBLICATIONS

Korean Intellectual Property Office, PCT/US2015/051836, International Search Report and Written Opinion, dated Jun. 23, 2016, 10 pages, Korea.
(Continued)

*Primary Examiner* — Andrew G Yang

(57) ABSTRACT

The disclosed embodiments include a method, apparatus, and computer program product for generating multiple correlated meshes around complex and discrete fractures for the purpose of reservoir simulation. In an initial two-stage process, a 2.5-dimensional mesher algorithm, may be used in conjunction with an extended anisotropic geometry-adaptive refinement algorithm to produce, from a structured grid Earth Model, a refined reservoir model. Fractures may be modeled as a volumetric mesh that is independent of the refined reservoir model. Thereafter, the two independent, overlapping meshes are combined by forming matrix-matrix, fracture-fracture, and matrix-fracture connections to form a single model to allow rapid simulation of an extremely complex fracture network with sufficiently accurate results.

18 Claims, 21 Drawing Sheets

(51) Int. Cl.
*G06F 17/17* (2006.01)
*G06T 17/05* (2011.01)

(56) References Cited

U.S. PATENT DOCUMENTS

| | | | |
|---|---|---|---|
| 2010/0138196 A1 | 6/2010 | Hui et al. | |
| 2010/0138202 A1* | 6/2010 | Mallison | E21B 43/00 703/10 |
| 2012/0179436 A1* | 7/2012 | Fung | E21B 49/00 703/2 |
| 2013/0096889 A1 | 4/2013 | Khvoenkova et al. | |
| 2013/0231907 A1* | 9/2013 | Yang | G01V 99/005 703/2 |
| 2014/0046636 A1* | 2/2014 | Mustapha | G06F 17/5018 703/2 |
| 2014/0136171 A1* | 5/2014 | Sword, Jr. | G01V 11/00 703/10 |
| 2016/0042096 A1* | 2/2016 | Kumar | G06F 17/50 703/1 |
| 2017/0074770 A1* | 3/2017 | Fourno | G01N 15/082 |

FOREIGN PATENT DOCUMENTS

| | | |
|---|---|---|
| WO | WO-2015002644 A1 | 1/2015 |
| WO | WO-2015002645 A1 | 1/2015 |
| WO | WO-2016076847 A1 | 5/2016 |

OTHER PUBLICATIONS

M. Karimi-Fard, L.J. Durlofsky, and K. Aziz, An Efficient Discrete-Fracture Model Applicable for General-Purpose Reservoir Simulators, , Feb. 3-5, 2003, 10 pages, SPE 88812, Society of Petroleum Engineers, 2003 SPE Reservoir Simulation Symposium, Houston, Texas.

French Patent Office, Application No. FR1658057, Preliminary French Report and Written Opinion, dated Feb. 8, 2019, 11 pages, France.

Youssef Mesri, Hervè Guillard and Thierry Coupez, Automatic coarsening of three dimensional anisotropic unstructured meshes for multigrid applications, Applied Mathematics and Computation, vol. 218, Issue 21, Jul. 1, 2012, 20 Pages, Copyright® 2012 Elsevier Inc. France.

* cited by examiner

SIMULATING FRACTURED RESERVOIRS USING MULTIPLE MESHES

This application is a U.S. national stage patent application of International Patent Application No. PCT/US2015/051836 filed on Sep. 24, 2015, the benefit of which is claimed and the disclosure of which is incorporated herein by reference in its entirety.

TECHNICAL FIELD

The present disclosure generally relates to a system and method for generating a grid that can be used to construct a simulation model of a subsurface reservoir, and more particularly, to a system and method configured for modeling geological fractures.

BACKGROUND

In the oil and gas industry, reservoir modeling involves the construction of a computer model of a petroleum reservoir for the purposes of improving estimation of reserves and making decisions regarding the development of the field. For example, geological models may be created to provide a static description of the reservoir prior to production. Reservoir simulation models may also be used to simulate the flow of fluids within the reservoir over its production lifetime.

One challenge with reservoir simulation models is the modeling of fractures within a reservoir, which requires a thorough understanding of matrix flow characteristics, fracture network connectivity and fracture-matrix interaction. Fractures can be described as open cracks or voids within the formation and can either be naturally occurring or artificially generated from a wellbore. The correct modeling of the fractures is important as the properties of fractures such as spatial distribution, aperture, length, height, conductivity, and connectivity significantly affect the flow of reservoir fluids to the well bore.

Mesh generation techniques are used in reservoir modeling. Two traditional mesh generation techniques for three-dimensional (3D) reservoir simulation are structured-based meshing and extrusion based meshing. In structured techniques, hexahedra are connected in a logical 3D i-j-k space with each interior mesh node being adjacent to 8 hexahedra. Extensions to structured techniques include local grid refinement where local regions of an original grid are replaced with finer grids. This can become time-consuming, computationally expensive, and prohibitively burdensome when dealing with general reservoir geometries, such as arbitrary 3D fracture surfaces. Because of the inherent 2.5 dimensional (2.5D) nature of existing extrusion techniques, similar limitations apply to these techniques. Alternative, fully unstructured meshing techniques exist, including tetrahedralization and polyhedral meshing schemes. The increased complexity of these techniques often leads to lower robustness as compared to structured techniques, especially, in the presence of imperfect geometry input.

Accordingly, simulation of reservoirs with large fracture systems, of arbitrary geometry and orientation, is difficult, with tradeoffs required between sufficient accuracy and reasonable computational time. As an example, simulation of a shale reservoir may generate a natural fracture network consisting of tens of thousands of fractures defined geometrically by hundreds of thousands of triangles. Such complex systems are not easily resolved using a 2.5-dimensional reservoir meshing system, and when resolved in three dimensions, often produce prohibitively large simulation models which take significant time to simulate.

BRIEF DESCRIPTION OF THE DRAWINGS

Embodiments are described in detail hereinafter with reference to the accompanying figures, in which.

DETAILED DESCRIPTION

Figure 1A:
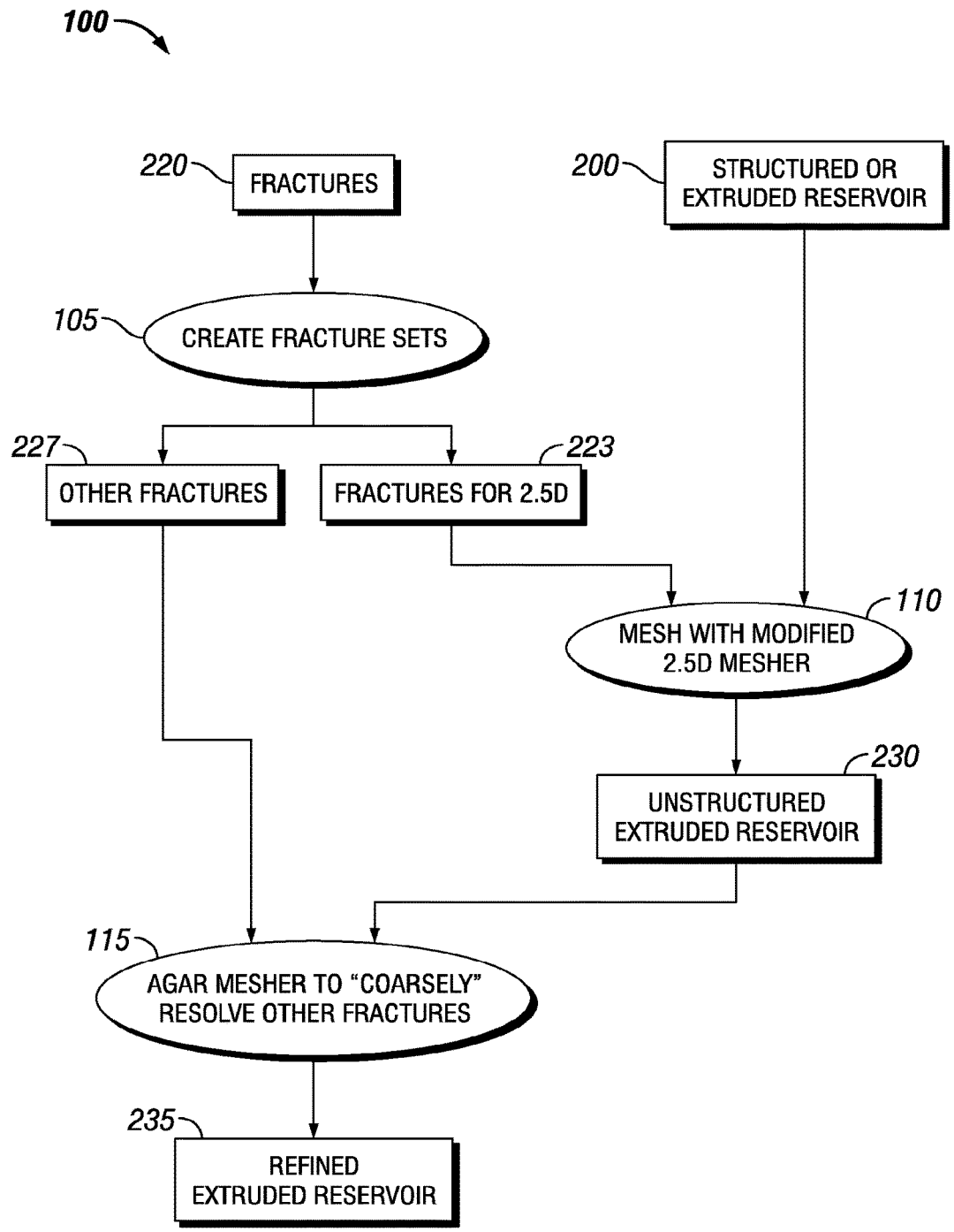
FIGS. 1A-1C are high-level flow charts outlining a multiple mesh method for modeling a fractured hydrocarbon reservoir using a multiple mesh system according to one or more embodiments.

The present disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper," "uphole," "downhole," "upstream," "downstream," and the like, may be used herein for ease of description to describe one element or feature's relationship to another element(s) or feature(s) as illustrated in the figures. The spatially relative terms are intended to encompass different orientations of the apparatus in use or operation in addition to the orientation depicted in the figures.

The present disclosure details a method and system to simulate reservoirs with large fracture systems, of arbitrary geometry and orientation, with sufficient accuracy and in reasonable time using commercial simulator systems by selectively resolving data into significantly smaller simulation models. Various reservoir and fracture models are combined to form a single reservoir model which can be readily simulated with lower computational demand yet which has sufficient resolution to capture the flow patterns near fractures. Accordingly, the disclosed embodiments provide a system, method, and computer program product for generating hybrid computational meshes around complex and discrete fractures for the purpose of reservoir simulation.

Figure 1B:
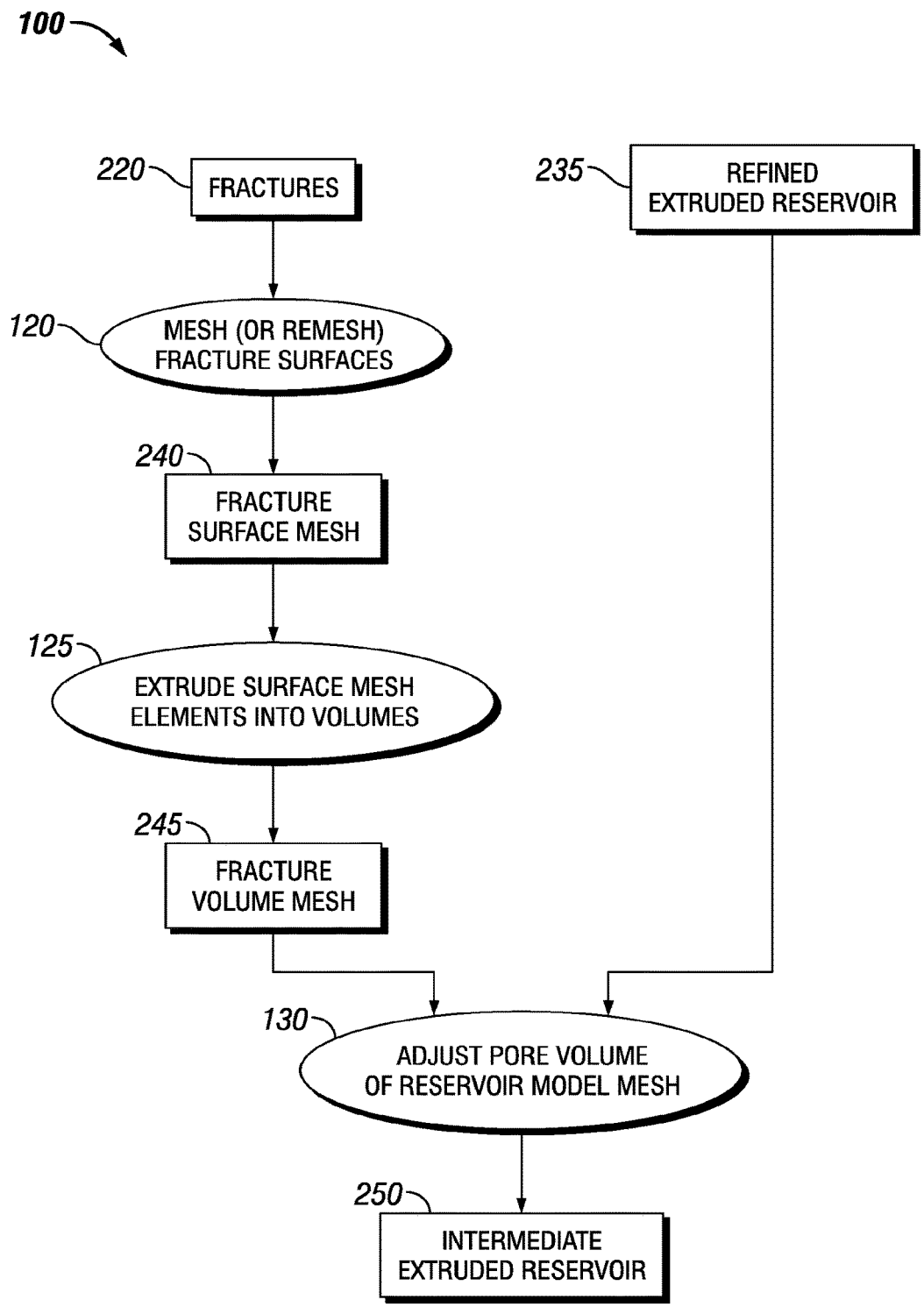
Figure 1C:
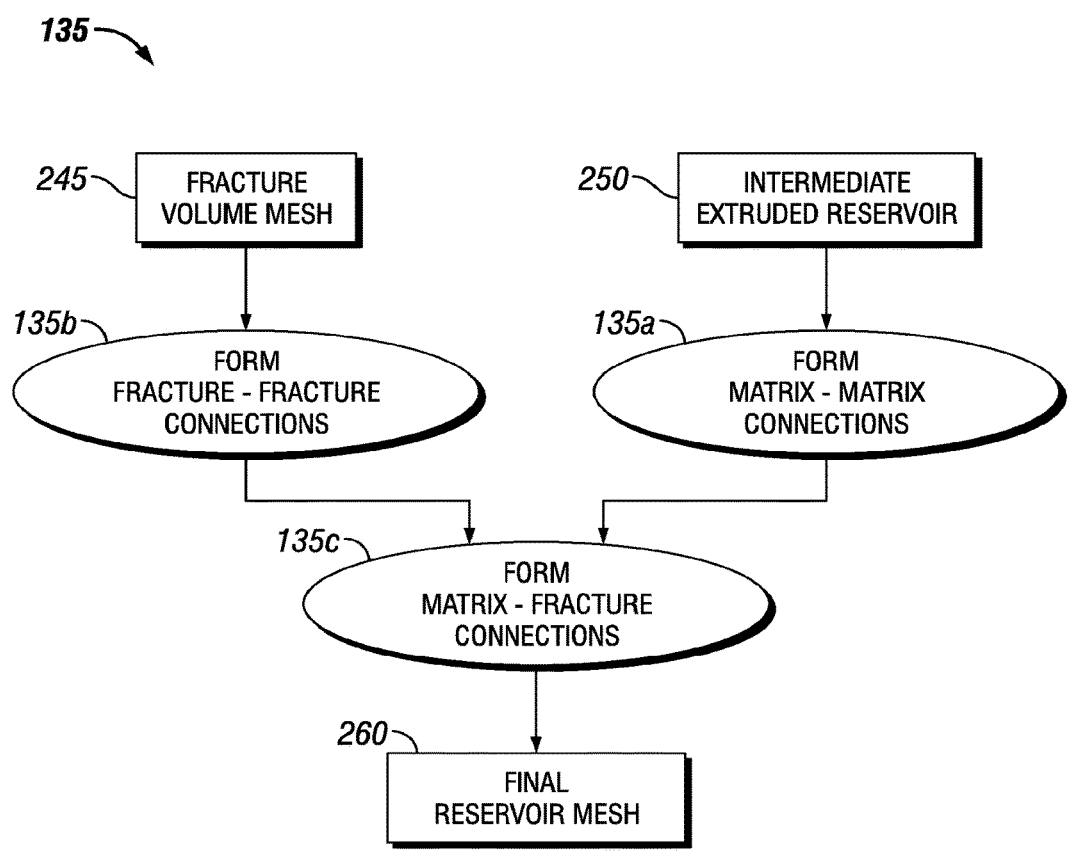

FIGS. 1A-1C together form a three-part high-level flow chart outlining a multiple mesh method 100 for modeling a fractured hydrocarbon reservoir according to one or more embodiments. FIG. 1A outlines a first portion of method 100 to create a volumetric mesh of the fractured reservoir that appropriately resolves desired fractures. More particularly, the first portion of method 100 depicted in FIG. 1A discloses an initial two-stage process according to an embodiment in which a 2.5-dimensional (2.5D) mesher algorithm, such as a stadium mesher, is used in conjunction with an extended anisotropic geometry-adaptive refinement (AGAR) algorithm to produce, from a structured grid Earth Model, a refined reservoir model. This combination may maintain computational speed and orientation control advantages of a 2.5D mesher where desired, while also invoking an extended AGAR algorithm to resolve general 3D fracture networks. A network of fractures can be represented as geometry and fracture properties. The set of fractures may be divided into two groups: Those to be resolved in the 2.5-dimensional mesh and those to be resolved only in the final, three-dimensional mesh. The 2.5D-permitting fractures include fractures represented by vertical planes or substantially vertical planes with respect to the horizon. The other fractures can include fractures represented by horizontal planes or substantially horizontal planes. A 2.5-dimensional mesh is first created by using the 2.5 stadium mesher to resolve the 2.5D-permitting fractures in a three-dimensional (3D) space. An extended AGAR algorithm then anisotropically resolves the other fractures to produce a refined reservoir model. Refinement, as used herein, refers to the splitting of cells in the 3D space that ultimately results in a higher mesh resolution model. The extended AGAR algorithm may be applied directly to topologies including hexahedral, triangular prisms and other general prismatic elements to provide appropriate cell grading in the near-fracture region. FIG. 1B outlines a second portion of method 100 to model the fractures as a volumetric mesh that is independent of the reservoir mesh. Finally, as illustrated in FIG. 1C, the two independent, overlapping meshes are combined to form a single model to allow rapid simulation of an extremely complex fracture network with sufficiently accurate results.

However, depending on the type of input and the desired simulation, certain illustrated steps of method 100 may be omitted. Moreover, in some alternative implementations, the steps outlined in FIGS. 1A-1C may occur out of the order depicted in the figures. For example, two blocks shown in succession may, in fact, be executed substantially concurrently, or the blocks may sometimes be executed in the reverse order, depending upon the functionality involved.

The flowchart of FIGS. 1A-1C illustrate an architecture, functionality, and operation of possible implementations of systems, methods and computer program products according to various embodiments of the present disclosure. In one or more embodiments, each block and/or combinations of blocks of the illustrated flowchart may be implemented by special purpose hardware-based systems that perform the specified functions or acts, or combinations of special purpose hardware and computer instructions.

Referring to FIG. 1A, a reservoir model 200 initially provides subsurface stratigraphic detail of a reservoir, including, for example, geo science interpretation, petroleum system modeling, geochemical analysis, stratigraphic gridding, facies, net cell volume, and petrophysical property modeling. Earth modeling platforms include platforms such as, for example, DecisionSpace®, which is commercially offered through Halliburton Energy Services Inc. of Houston Tex. A variety of other earth modeling platforms, however, may also or instead be utilized with the present disclosure. Moreover, reservoir model 200 may enable robust data retrieval and integration of historical and real-time reservoir related data that spans across all aspects of the well planning, construction and completion processes such as, for example, drilling, cementing, wireline logging, well testing and stimulation. Such data may include, for example, logging data, well trajectories, petrophysical rock property data, mechanical rock property data, surface data, fault data, data from surrounding wells, data inferred from geostatistics, etc. A database (not illustrated) may store this information. An example database platform is, for example, the INSITE® software suite, commercially offered through Halliburton Energy Services Inc. of Houston Tex. A variety of other database platforms, software platforms, and associated systems can be used to retrieve, store and integrate the well related data.

Figure 2:
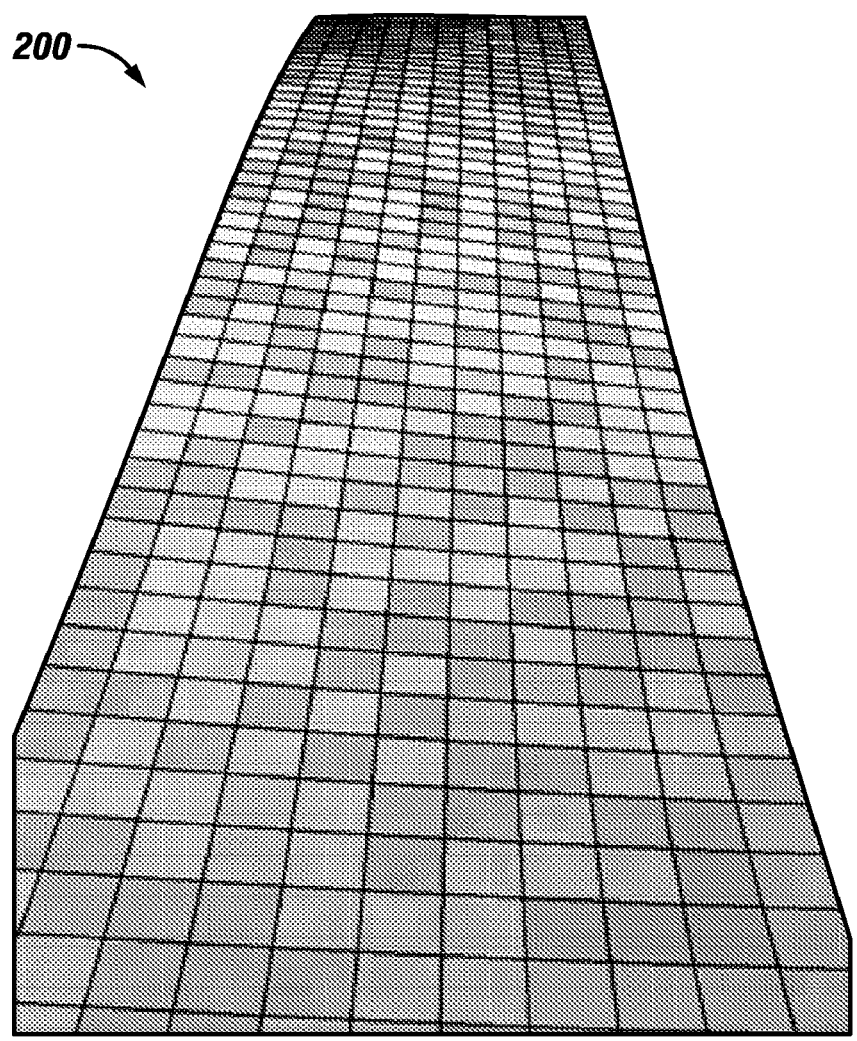
FIG. 2 perspective of the top surface of a structured or extruded mesh definition of an exemplary reservoir provided as a structured Earth Model, according to one or more embodiments.

Reservoir simulation users may have reservoir description input in various forms. For example, users may begin with a structured Earth Model or a definition that can easily be made into a structured Earth Model. Initial reservoir models often contain only vertical mesh columns. However, structured reservoir mesh 200 may be obtained by any suitable method and provided in any suitable form. FIG. 2 graphically illustrates a structured or extruded mesh definition of a reservoir provided as a structured Earth Model (EM). The shading of the meshes may indicate hydrocarbon content, density, porosity, combinations thereof, or the like.

Also depicted in FIG. 1A, initial fractures model 220 provides the geometric definition of the fracture network, along with the petrophysical and mechanical property distributions for the fractures. Example fracture system modules may be implemented using, for example, the Fracpro® or Gohfer® platforms. Other platforms and software systems, however, can be used to implement fracture system model 220.

Figure 3:
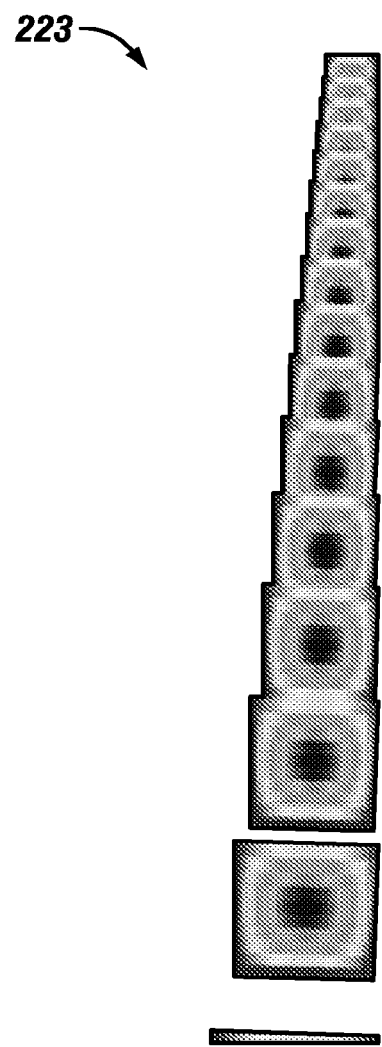
FIG. 3 is a perspective view of an exemplary hydraulic fracture model defined using surfaces, according to an embodiment.
Figure 4:
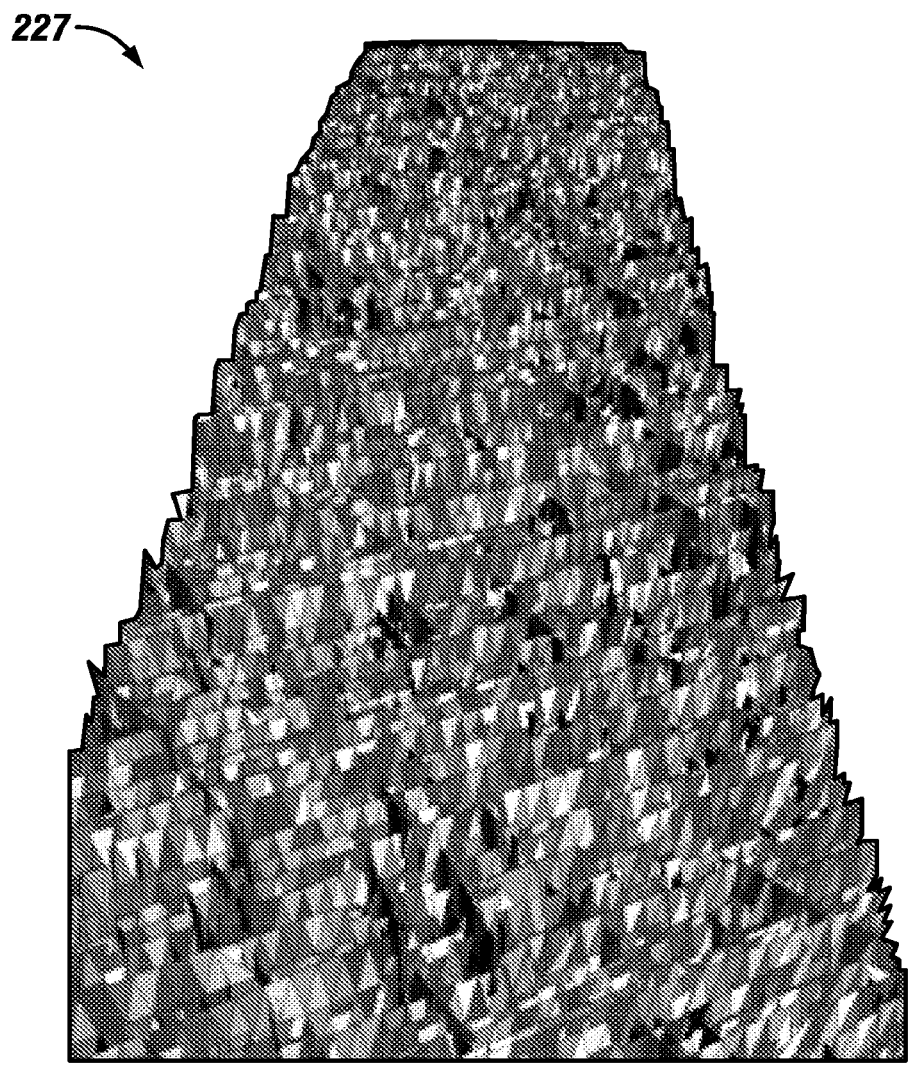
FIG. 4 is a perspective view of an exemplary natural fracture model defined using surfaces, according to an embodiment.

Fracture model 220 may be separated at step 105 into a first set of fractures 223, typically hydraulic fractures, that are well suited for 2.5 dimensional (2.5D) modeling and a second set of fractures 227, typically natural fractures, that are less suitable for 2.5D modeling. The two sets of fractures are not necessarily mutually exclusive. That is, some subset of fractures can be in both sets of fractures. Graphical illustrations of an exemplary hydraulic fracture model and a typical natural fracture model are shown in FIGS. 3 and 4, respectively, which may be defined as surfaces. The shading of the surfaces may represent the size or fluid resistance of fractures, for example.

The reservoir and fracture models of FIGS. 2-4 collectively comprise the initial data to form the final fracture network model of multiple mesh method 100. Referring to FIG. 1A, structured reservoir model 200 may be modified so as to replace part of the existing structured reservoir mesh with one or more fracture models, as indicated in step 110. Recall that at step 105, a subset 223 of the fractures 220 (particularly hydraulic fractures) to be resolved in the structured reservoir model 200 via 2.5D meshing is determined. Typically, subset 223 is a simple selection of fractures that are connected to the well bore via high conductivity paths. Subset 223 may be integrated with structured reservoir model 200 at step 110 using a 2.5D meshing algorithm, such as a stadium mesher, to resolve planar, vertical fractures an oft used geometry to represent hydraulic fractures to create an unstructured extruded reservoir mesh 230.

Figure 5A:
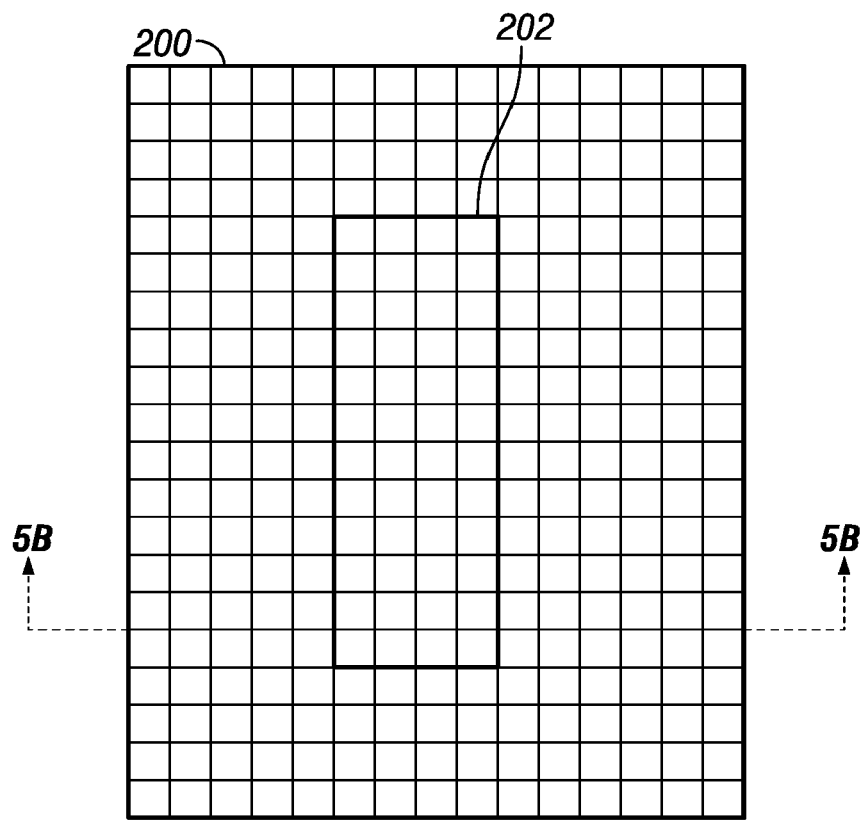
FIG. 5A is a plan view of an exemplary initial structured reservoir model referenced in the flow chart of FIG. 1A.
Figure 5B:
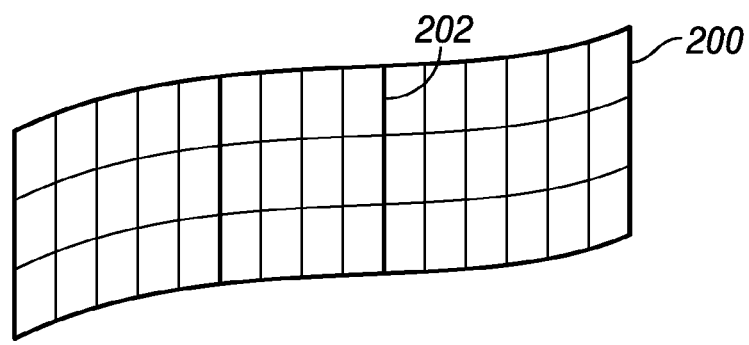
FIG. 5B is an elevation cross-sectional view of the reservoir model of FIG. 5A taken along lines 5B-5B of FIG. 5A.
Figure 6A:
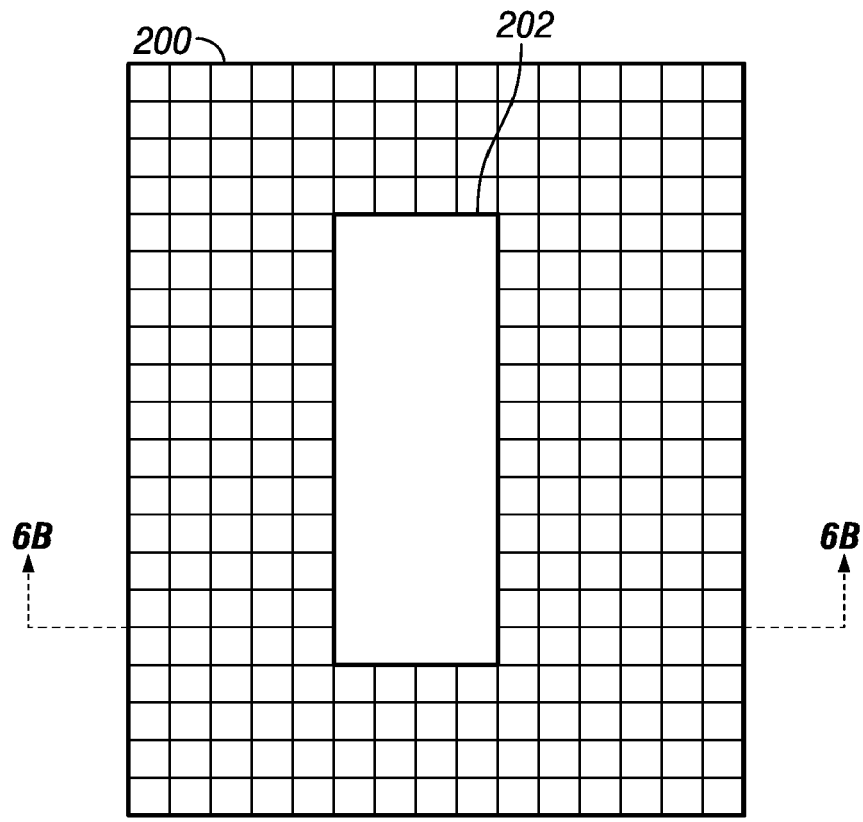
FIG. 6A is a plan view of the reservoir model of FIG. 5A, shown with a portion of the mesh removed for subsequent insertion of a 2.5 dimension unstructured fracture mesh.
Figure 6B:
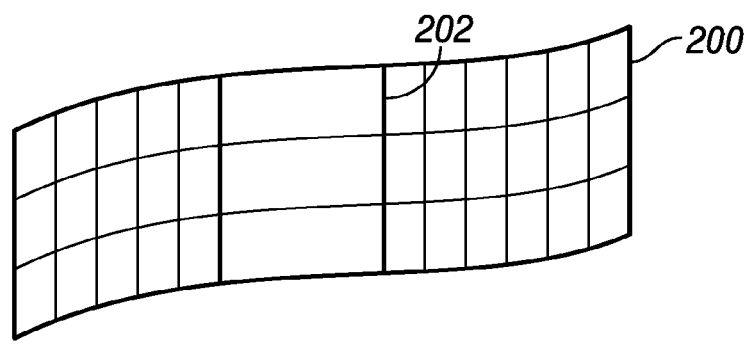
FIG. 6B is an elevation cross-sectional view of reservoir model of FIG. 6A taken along lines 6B-6B of FIG. 6A.

For instance, FIG. 5A is a plan view of an exemplary initial structured reservoir model 200. FIG. 5B is an elevation cross section of initial structured reservoir model 200 of FIG. 5A taken along lines 5B-5B. A region 202 associated with a single hydraulic fracture is identified. FIGS. 6A and 6B are plan and cross-sectional elevation views, respectively, of structured reservoir model 200 shown in an intermediate stage of step 110 with fracture region 202 removed. Although a rectangular region 202 was identified and removed for insertion of fractures 220, any appropriate polygonal shape may be used as conditions dictate.

Figure 7A:
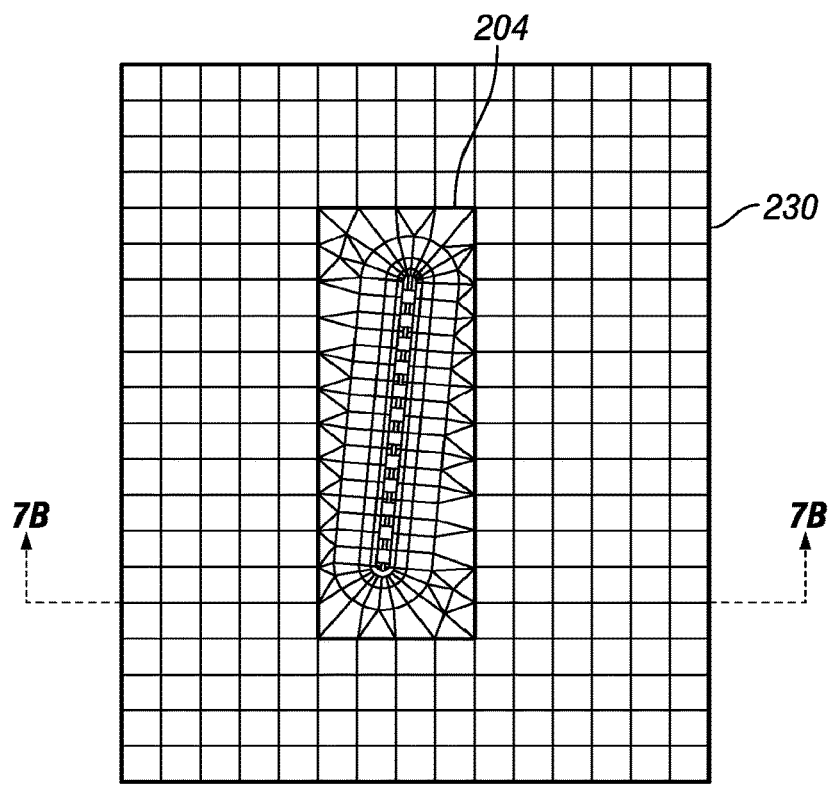
FIG. 7A is a plan view of the reservoir model of FIG. 6A, shown with an inserted 2.5 dimension unstructured fracture mesh in the top layer.
Figure 7B:
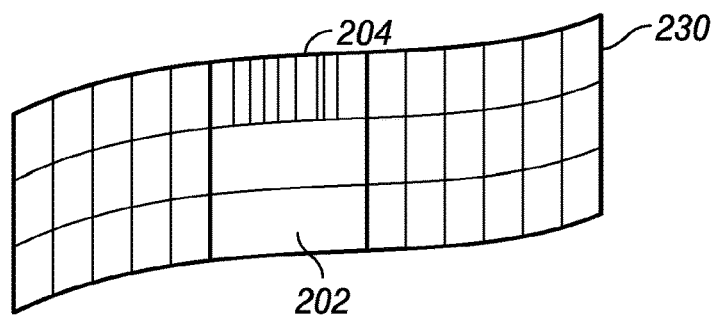
FIG. 7B is an elevation cross-sectional view of the reservoir model of FIG. 7A taken along lines 7B-7B of FIG. 7A.
Figure 7C:
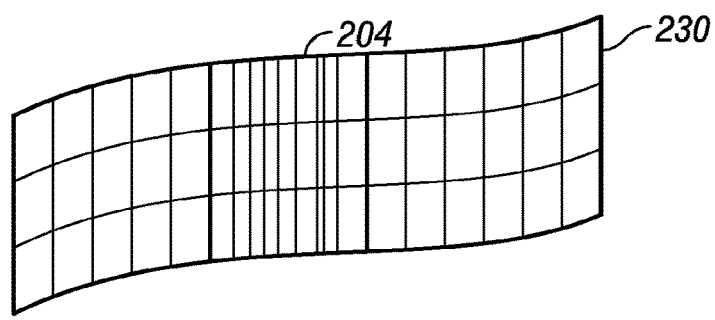
FIG. 7C is the elevation cross-sectional view of the reservoir model of FIG. 7B, shown with the unstructured fracture mesh extruded downwardly.

FIGS. 7A and 7B are plan and cross-sectional elevation views, respectively, of an unstructured reservoir model 230 with an unstructured 2D fracture mesh 204 originally projected onto the top surface of an otherwise structured mesh. A two-dimensional (2D) meshing scheme may be used to add resolution near fracture subset 223 to create fracture mesh 204. As shown in the cross-sectional elevation view of FIG. 7C, fracture mesh 204 is then projected to the next lower mesh surface, and the process is repeated until region 202 has been filled with the new elements. Note that in in the section view of FIG. 7C the 2.5D fracture mesh 204 appears structured. The original structured reservoir model mesh 200 may be modified to remove section 202 to be replaced with the unstructured fracture mesh 204, and the layers of original structured reservoir model mesh 200 may be used to guide the extrusion of fracture mesh 204. The properties of original structured reservoir model 200 are mapped onto the new topology of unstructured reservoir model mesh 230.

Although any appropriate 2.5D meshing algorithm may be used for step 110, in one or more embodiments, a stadia mesher, which is operable to quickly generate unstructured grids using structured elements around complex geometries, may be used as follows: Fractures subset 223 may be discretized in a two-dimensional plane by a collection of line segments. The collection of line segments represents the intersection between the two-dimensional plane and the three-dimensional geological fractures. Each fracture in subset 223 may be represented by a collection of straight line segments to approximate a curvature of the fracture.

For each fracture line segment in the two-dimensional plane, a set of stadia is generated at a specified radii from the respective fracture line segment. Thereafter, closed loops are generated around all of the line segments of a fracture. The process of generating the closed loop around line segments of the fracture may include computing an intersection of all stadia sides for each specified radius for each line segment of the fracture and discarding the contained segments for each straight line segment in each fracture line segment that are wholly contained by stadia of other line segments in the fracture line segment.

Following the creation of closed loops, shape elements may be generated within the closed loops of the straight line segment. For example, parametrical segments may be generated along a length and radius of each straight line segment. Where possible, quadrilateral elements are formed within the structured region, and polygons are formed within the remaining regions of the closed loops.

Once the shape elements are generated, a constrained mesh is generated around the closed loops of the set of fracture line segments, filling the remainder of the two-dimensional plane. In one or more embodiments, a Delaunay triangulation algorithm is employed to generate the constrained mesh around the closed loops of the set of fracture line segments. Thus, the two-dimensional plane now consists entirely of cell elements of the fracture line segments and the constrained mesh. From here, the process can extrude each of the cells in the two-dimensional plane to a third dimension for creating one or more layers of three-dimensional cells.

The cells within a closed loop of a fracture line segment represent a three-dimensional fracture, whereas the cells within the mesh represent the rock layers encompassing the fractures. Thus, the process can assign reservoir properties such as, but not limited to, porosity and permeability, to each of the three-dimensional cells for modeling the fluid flow of the reservoir. A 2.5D stadia meshing algorithm is discussed in greater detail hereinafter.

Figure 8:
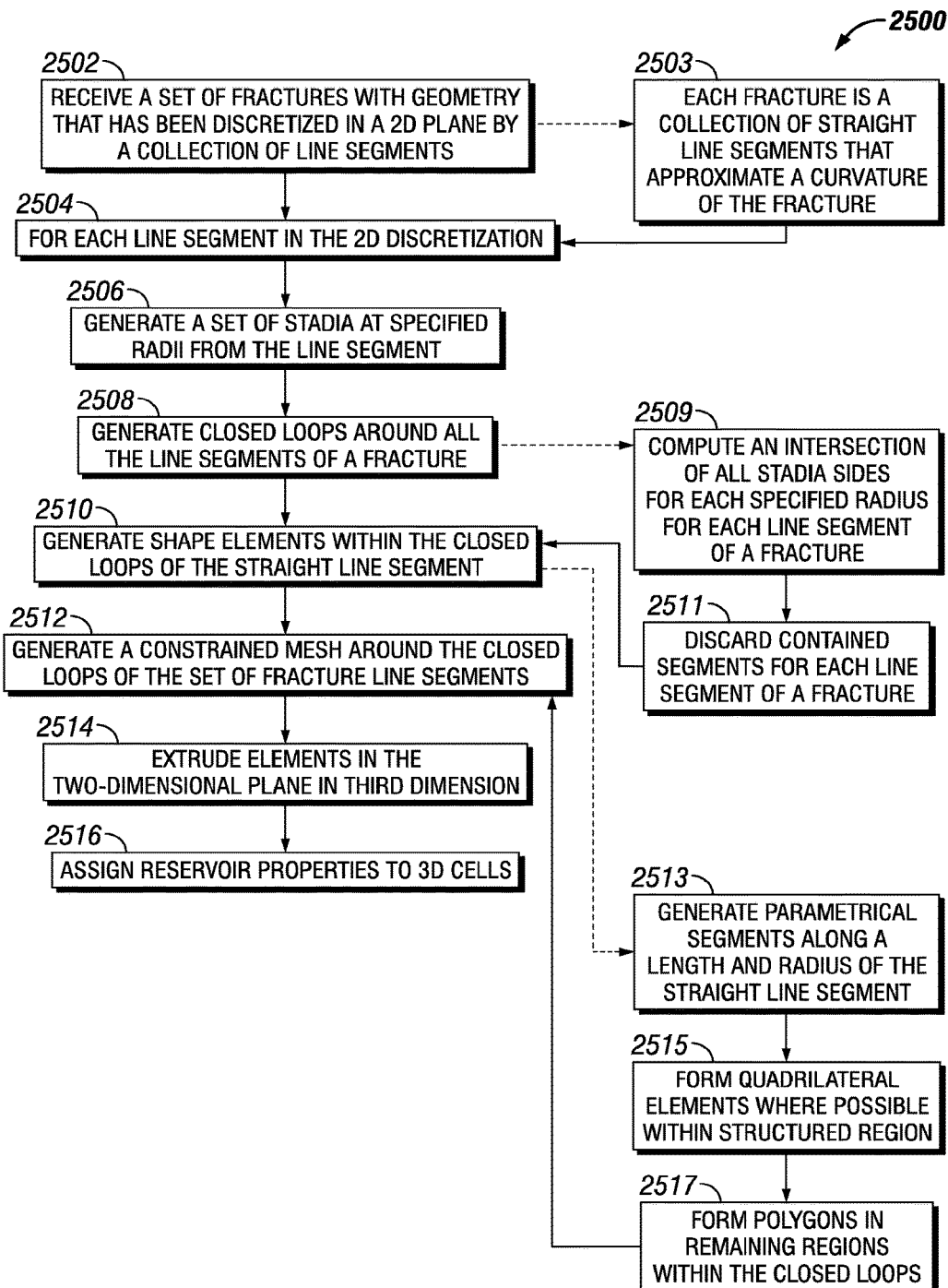
FIG. 8 is a flowchart of a process for 2.5-dimension modeling of certain fractures according to FIG. 1A and certain illustrative examples of the present disclosure.

FIG. 8 is a flow chart outlining a process 2500 for modeling 3D fractures using a 2.5D stadium mesher according to one or more embodiments. The process 2500 begins at block 2502 by receiving a set of fractures 223 (FIG. 1A) with geometry that has been discretized in a 2D plane by a collection of line segments. In an alternative, the process 2500 may begin by performing the discretization of a set of fractures 223 in a 2D plane by a collection of line segments. The collection of line segments can represent the intersection between the 2D plane and the 3D geological fractures.

As shown in block 2503, each fracture can be represented by a collection of straight line segments to approximate a curvature of the fracture.

At block 2504, for each fracture line segment in the 2D plane, process 2500 performs block 2506 to generate a set of stadia at a specified radii from the respective fracture line segment. Then, at block 2508, process 2500 then generates closed loops around all of the line segments of a fracture. In certain embodiments, block 2508 includes a process of generating the closed loops around line segments of the fracture. This can include computing an intersection of all stadia sides for each specified radius for each line segment of the fracture, as shown at block 2509 in FIG. 8, and discarding the contained segments for each straight line segment in each fracture line segment that are wholly contained by stadia of other line segments in the fracture line segment, as shown at block 2511.

After completing block 2508 (and optional blocks 2509 and 2511 in certain embodiments), the process 2500 proceeds to block 2510. At block 2510, shape elements may be generated within the closed loops of the straight line segment. For example, in one embodiment, the process 2500 generates parametrical segments along a length and radius of each straight line segment, as shown in block 2513.

Process 2500 then forms quadrilateral elements where possible within the structured region at block 2515, and forms polygons within the remaining regions of the closed loops at block 2517. After generating the shape elements, process 2500 can generate a constrained mesh around the closed loops of the set of fracture line segments, filling the remainder of the 2D plane at block 2512. In one embodiment, a Delaunay triangulation algorithm can be utilized to generate the constrained mesh around the closed loops of the set of fracture line segments. Thus, the 2D plane now consists entirely of cell elements of the fracture line segments and the constrained mesh.

At this point, process 2500 can extrude each of the cells in the 2D plane to a third dimension for creating one or more layers of 3D cells. The cells within a closed loop of a fracture line segment can represent a 3D fracture, whereas the cells within the mesh can represent rock layers encompassing the fractures. Thus, the process 2500 can assign reservoir properties such as, but not limited to, porosity and permeability, to each of the 3D cells for modeling the fluid flow of the reservoir, as shown at block 2516.

Referring back to FIG. 1A, once unstructured model mesh 230 has been created to capture the pressure field near the first subset of fractures 223, at step 115, an extended anisotropic geometry-adaptive refinement (AGAR) mesher algorithm may be used to capture the flow near the remaining second subset of fractures 227. That is, an unstructured AGAR algorithm may be used to refine the unstructured mesh of model 230 to resolve the remaining fractures 227, thereby creating refined reservoir model mesh 235.

In one or more embodiments, refinement can be coarse for all the remaining fractures 227. Often, a significant portion of the fractures of subset 227 will contribute less significantly to the flow of the reservoir system and produce less severe pressure gradients. When this is expected to be the case, these areas do not require as much mesh resolution as those fractures 223 handled primarily with the 2.5D meshing scheme. Accordingly, a reduction in element count may be obtained as compared to a reservoir-wide use of the unstructured AGAR algorithm. However, the unstructured AGAR algorithm may be tuned to provide higher resolution near particular fractures that are expected to contribute more significantly to the flow of the reservoir.

An extended AGAR mesher algorithm suitable for use in step 115 according to one or more embodiments is now described. In general, the AGAR mesher algorithms refines cell edges up to a number n times and does not split any edge (i.e., splitting the cell) that will produce an edge shorter than a TargetSize. As defined herein, TargetSize is the desired mesh size, or edge length, for resolving the fracture width. In certain embodiments, the TargetSize value is provided to the system based upon a desired level of accuracy and the desired time to solution. It may determine whether a given cell should be refined and in what direction refinements should occur. In some embodiments, there may be two types of rules for determining whether a cell should be refined: 1) gradation rules (rules that ensure slow transitions in element side); and 2) intersection rules (rules that ensure the fractures are adequately represented).

To summarize the AGAR implementation of step 115, consider the U-direction (one direction of three cardinal directions in a 3D space). Note that U is a direction in a topological sense, not in a Euclidean sense. The U-direction for each cell is independent of the U-direction for a neighboring cell. Further, within a cell, one U edge might point in a slightly different direction than another U edge. As will be described in more detail below, considering the U-direction, the extended AGAR algorithm will analyze all cells within the model and refine those near-fracture cells in the U-direction if all U edges are longer than C×TargetSize and at least one of the following five rules are met: 1) a scaled U edge intersects a fracture; 2) for any opposing pair of edges in the U-direction, exactly one of the two scaled edges intersect a fracture; 3) a U edge has two or more 'hanging' nodes; 4) for any opposing pair of edges in the U-direction, exactly one of the two edges has two or more hanging nodes; or 5) the unsealed cell intersect a fracture but no scaled edge of the cell intersects a fracture. Referring to C×TargetSize, for an implementation-specific or user-supplied scalar variable, C, step 115 (FIG. 1A) will not split any edges (thus, cells) that are shorter than C×TargetSize. In this illustrative method, C is selected as √2, but could be other variables such as, for example, 4/3, or any finite value. This process is repeated for each direction in the 3D space.

Figure 9:
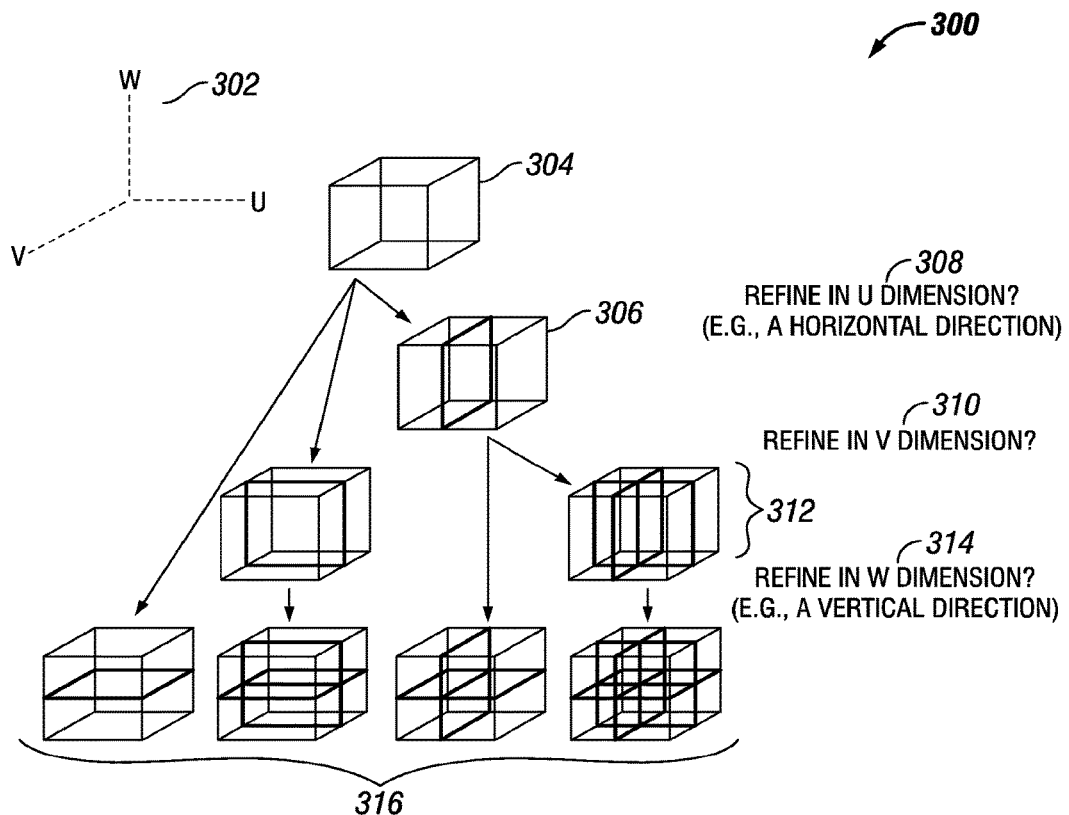
FIG. 9 depicts examples of refinement configurations for a single hexahedron cell within a three-dimensional U-V-W space, according to certain illustrative aspects of the present disclosure, which may be used in the flow chart of FIG. 1A.

As used herein, the term 'hanging node' is generally used to refer to a node created during the refinement of a neighboring cell, which is not required to maintain the underlying geometry of the cell of interest. For example, the underlying geometry of may be a hexahedron (such as shown in the examples of FIG. 9), a prism (such as shown in the examples of FIGS. 10-13), or other extruded element types. Consider a cell H, when a neighboring cell is refined, an extra node is added the hexahedron-shaped cell H. This node is 'hanging' with respect to cell H. In yet other examples, the edge length requirement may be omitted for rules 3 and 4 if strict adherence to the one hanging node guideline is adopted.

FIG. 9 illustrates a set 300 of possible refinement configurations 306, 312, and 316 for a single hexahedron cell 304 within a three-dimensional U-V-W space 302. In particular, FIG. 9 depicts how, for hexahedra, some embodiments can utilize a local, logical U-V-W space 302, and each cell is analyzed and refined in some subset of these three dimensions, U, V, and W, as shown in sub-steps 308, 310, and 314 of FIG. 9. Once the desired refinement directions have been determined for a cell, extended AGAR step 115 (FIG. 1A) performs the refinement (i.e., splitting of edges) for that cell. FIG. 9 illustrates eight possible refinement configurations for a single cell within a 3D U-V-W space 302. Extended AGAR step 115 (FIG. 1A) may iteratively performs refinement by first determining whether the near-fracture cells should be refined in the U, V, or W dimensions/directions (sub-steps, 308, 310, and 314 shown in FIG. 9), and then, if so, spitting the edges in the directions as shown to create cell refinements 306, 312, and/or 316. The eight possible configurations of cell refinements 304, 306, 312, and 314 range from refining in no refinement directions (hexahedron 304) to refining in all three refinement directions (the right-most refinement 316). Since these cells will be those cells positioned in the near-fracture region, the mesh resolution of the resulting images will be greatly improved.

Figure 10:
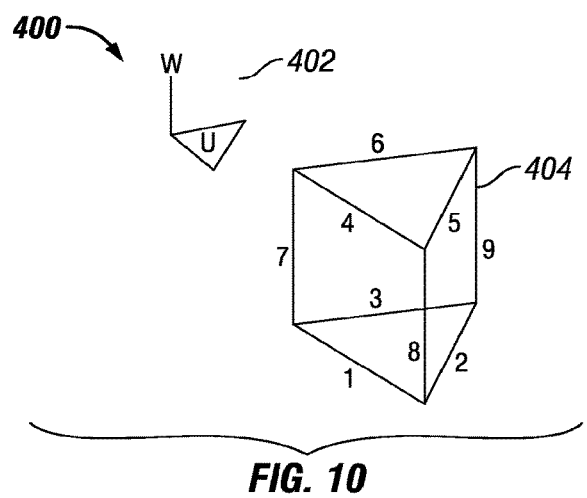
FIGS. 10 and 11 depict representative triangular prism cells showing a logical two-dimensional U-W coordinate system and a number scheme for edges of the prisms, according to certain illustrative aspects of the present disclosure, which may be used in the flow chart of FIG. 1A.

FIG. 10 shows a representative triangular prism cell 404 and a logical two-dimensional U-W coordinate system 402 and a number scheme for edges of the prism 404. Certain embodiments include two alternatives for extending the above-noted refinement concept to prisms. One is the single U-direction option shown in FIG. 10. The single U-direction encompasses all of the triangular face edges of prism 404. According to this definition of the directions, refinement, when it occurs on the triangular faces of prism 404, is always isotropic with respect to the face. In the example of FIG. 10, using the single U-direction option 400, each of edges 1 through 6 is considered to be in the U-direction. Refinement in U would refine all of these edges and refinement can be done in any subset of {U, W}.

Figure 11:
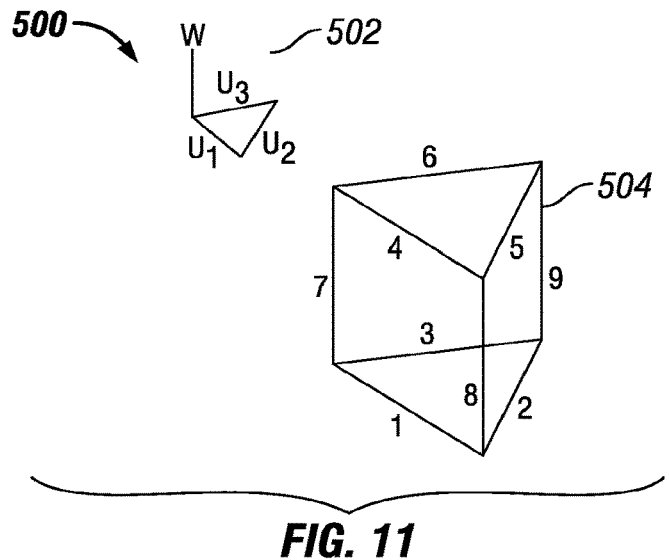

Another option is referred to herein as the multiple U-directions option, illustrated in FIG. 11. FIG. 11 shows a triangular prism cell 504 and a logical two-dimensional U-W coordinate system 502 and a number scheme for edges of the prism 504. Using the multiple U-directions option 500 of FIG. 11, refinement would be done in U-direction pairs. Thus, refinement could be done in a subset of the $\{U_1U_2, U_1U_3, U_2U_3, W\}$ directions 502 shown in FIG. 11. Generally, in the rules applied by certain embodiments, not all 16 permutations of the four directions (e.g., W, $U_1$, $U_2$, and $U_3$) are performed during the AGAR refinement step 115 (FIG. 1A). In the example of FIG. 11, the multiple U directions are considered in pairs. For example, refinement in $U_1U_2$ would refine edges 1, 2, 4, 5 of prism 504.

Figure 12:
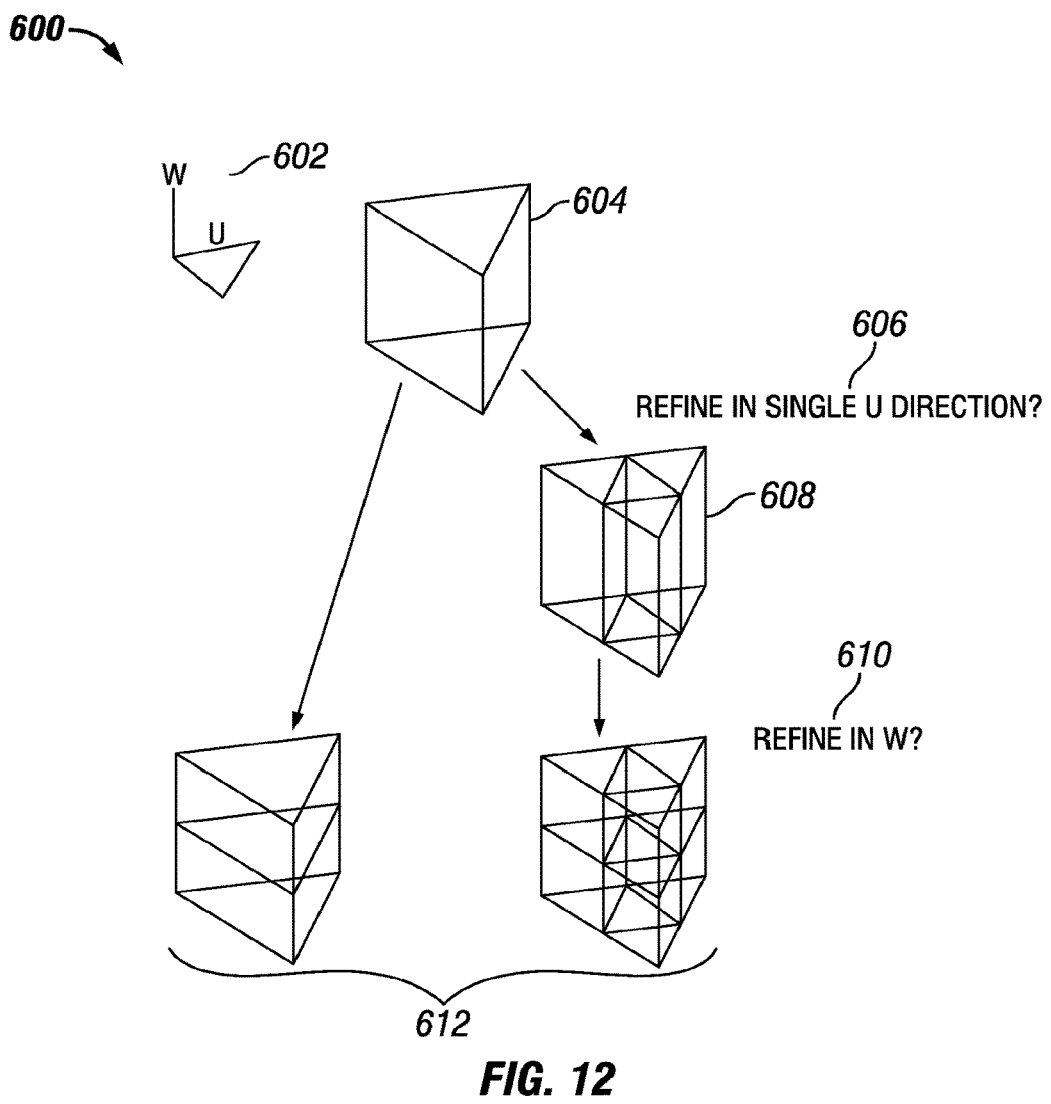
FIG. 12 depicts refinement configurations for a single prism cell using a single U-direction paradigm within the logical two-dimensional U-W coordinate system, according to certain illustrative examples of the present disclosure, which may be used in the flow chart of FIG. 1A.

FIG. 12 provides an AGAR refinement example of the single U-direction paradigm 600. Following the general notation and the extended AGAR algorithm discussed above, and using the canonical triangular prism numbering in FIG. 11, the edges of the cell, $C_i$, are labeled as $\{e_{i,j}\}$ for j=1 . . . 9. Consider now an abstract Boolean function on the edges, Test($\{e_{i,j}\}$). For example, the cell can be refined in: U if any edge from the set $\{e_{i,1}, e_{i,2}, e_{i,3}, e_{i,4}, e_{i,5}, e_{i,6}\}$ satisfies Test($\{e_{i,j}\}$) (sec sub-step 606 of FIG. 12), and W if any edge from the set $\{e_{i,7}, e_{i,8}, e_{i,9}\}$ satisfies Test($\{e_{i,j}\}$) (see sub-step 610 of FIG. 12).

The above condition is referred to as the primary condition for gradation. Opposing conditions are now defined. For the quadrilaterals in the prism 604, the rule is the same as it is for hexahedra (e.g., as discussed above with reference to FIG. 9). If, given two opposing edges on face, exactly one of those edges satisfies Test($\{e_{i,j}\}$), then the direction that divides those two edges will also be refined. For example, edges $\{e_{i,4}, e_{i,1}\}$ are opposing edges on a quadrilateral face. If edge $\{e_{i,4}\}$ satisfies Test($\{e_{i,j}\}$) but edge $\{e_{i,1}\}$ does not, then this condition would be satisfied, and direction W would be added the refinement set. Similarly, if edge $\{e_{i,7}\}$ satisfies Test($\{e_{i,j}\}$) but edge $\{e_{i,8}\}$ does not, direction W would be added the refinement set. For the triangular face, if exactly one satisfies Test($\{e_{i,j}\}$), then U is added to the refinement set. For example, if edge $\{e_{i,4}\}$ satisfies Test($\{e_{i,j}\}$) but edges $\{e_{i,5}, e_{i,6}\}$ do not, direction W would be added to the refinement set.

For the extended AGAR algorithm's gradation rules, Test($\{e_{i,j}\}$) is defined as true if and only if $\{e_{i,j}\}$ has been refined at least twice. For the extended AGAR algorithm's intersection rules, Test($\{e_{i,j}\}$) is defined as true if the scaled edge $\{e_{i,j}\}$ intersects a fracture of interest. FIG. 12 depicts the possible combinations of refinements 608 and 612 using the single U-direction paradigm 600.

Figure 13:
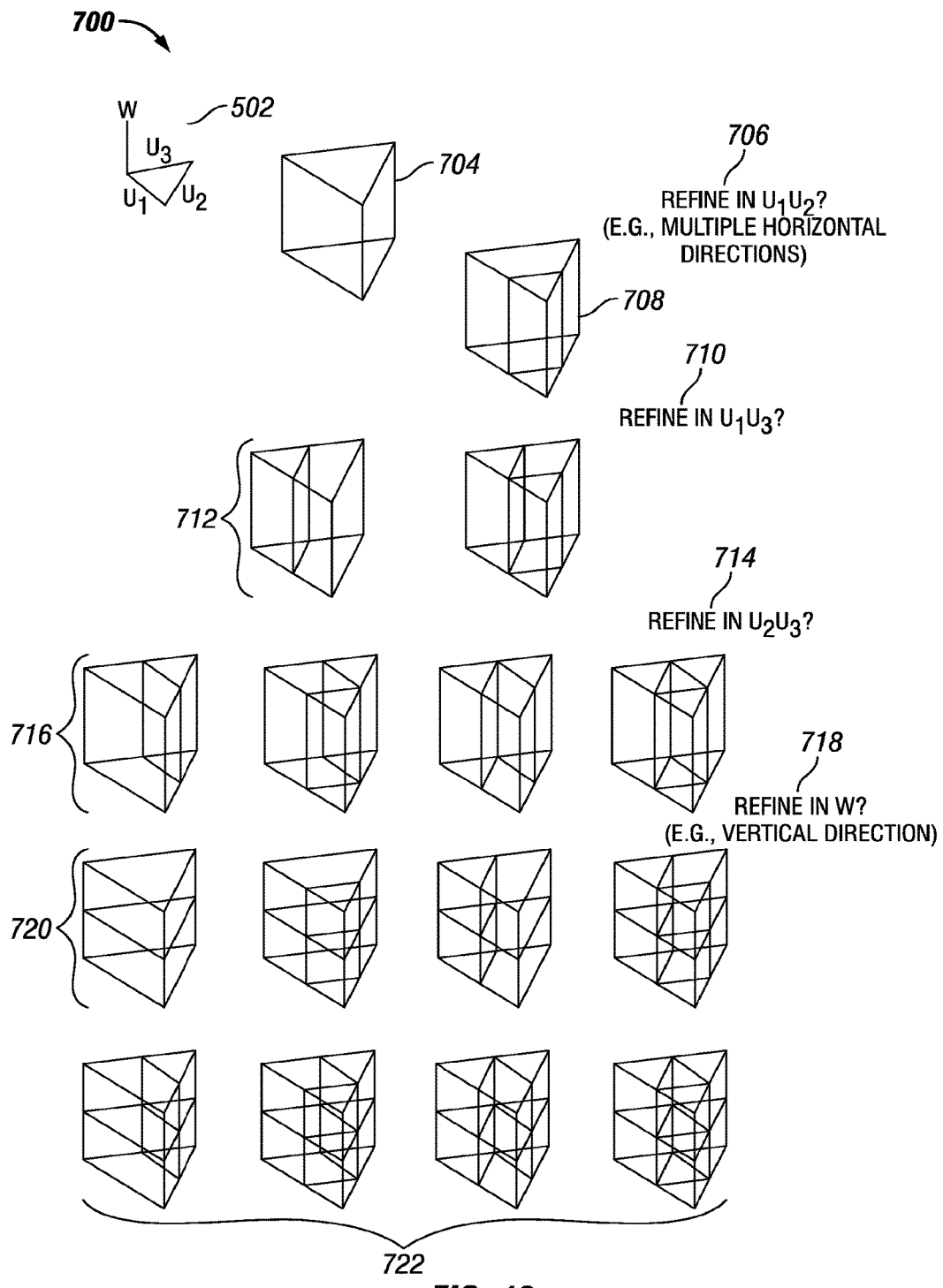
FIG. 13 illustrates refinement configurations in four directions using a multiple U-direction paradigm within the logical two-dimensional U-W coordinate system, according to certain examples of the present disclosure, which may be used in the flow chart of FIG. 1A.

FIG. 13 shows how, in an alternative to the single U-direction discussed above with reference to FIG. 12, a multiple U-directions paradigm 700. In particular, FIG. 13 shows refinements 708, 712, 716, 720, and 722 in the four logical dimensions/directions 702 for a multiple U directions paradigm 700 of a prism 704. Using the multiple U-directions paradigm 700, the cell will be refined in: $U_1U_2$ and $U_1U_3$ if any edge from the set $\{e_{i,1}, e_{i,4}\}$ satisfies Test($\{e_{i,j}\}$) (see sub-steps 706 and 710 of FIG. 13); $U_1U_2$ and $U_2U_3$ if any edge from the set $\{e_{i,2}, e_{i,5}\}$ satisfies Test($\{e_{i,j}\}$) (see sub-steps 706 and 714 of FIG. 13); $U_1U_3$ and $U_2U_3$ if any edge from the set $\{e_{i,3}, e_{i,6}\}$ satisfies Test($\{e_{i,j}\}$) (see sub-steps 710 and 714 of FIG. 13); and W if any edge from the set $\{e_{i,7}, e_{i,8}, e_{i,9}\}$ satisfies Test($\{e_{i,j}\}$) (see sub-step 718 of FIG. 13).

In addition to these primary conditions, opposing conditions exist. For quadrilaterals, the two U paradigms are very similar. If, given two opposing edges on a face, exactly one of those edges satisfies Test($\{e_{i,j}\}$), then the directions that divide those two edges will also be refined. If edge $\{e_{i,7}\}$ satisfies Test($\{e_{i,j}\}$) but edge $\{e_{i,8}\}$ does not, direction W would be added to the refinement set. In one example, for the triangular face rule, if exactly one edge satisfies Test($\{e_{i,j}\}$), then $U_1U_2$ and $U_1U_3$ can be added to the refinement set. In this paradigm, no opposing condition is added for the triangular faces. However, alternative rules can be determined and tested as part of paradigms beyond the paradigms 600 and 700 shown in FIGS. 13 and 13, respectively.

Figure 14:
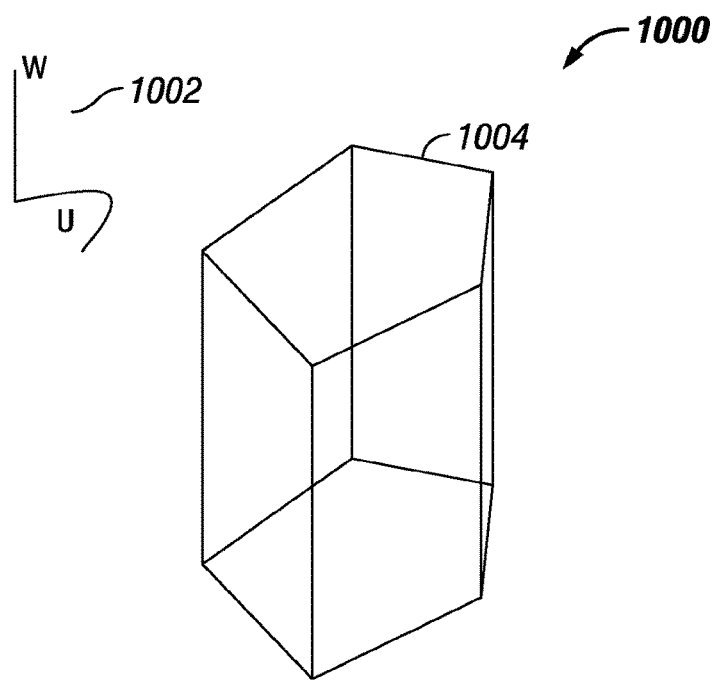
FIG. 14 illustrates a representative non-triangular prism (e.g., a general prismatic element) showing the logical two-dimensional coordinate system, according to certain features of the present disclosure, which may be used in the flow chart of FIG. 1A.
Figure 15:
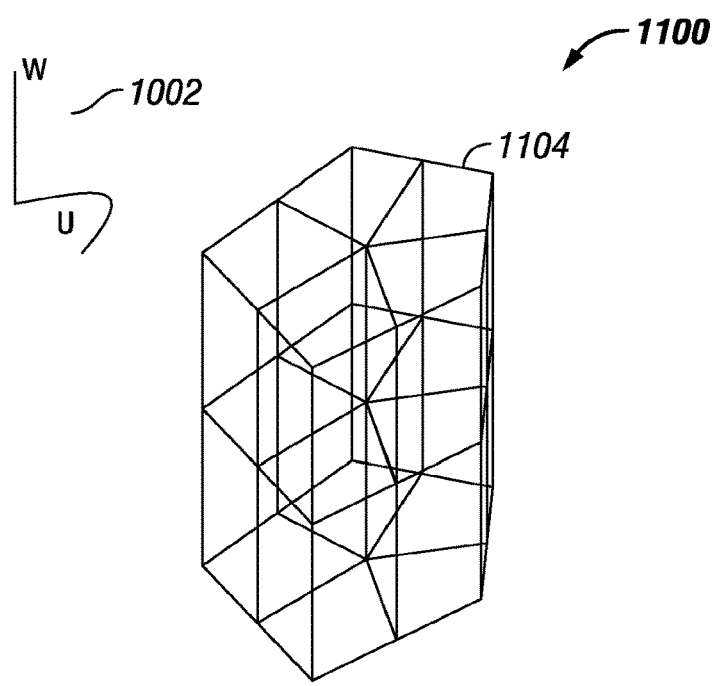
FIG. 15 illustrates possible refinement of a general prismatic element by subdividing the element into hexahedra, according to certain illustrative examples of the present disclosure, which may be used in the flow chart of FIG. 1A.

FIG. 14 illustrates a representative non-triangular prism 1004 (e.g., a general prismatic element) showing the logical two-dimensional coordinate system 1002. FIG. 15 illustrates possible refinement of a general prismatic element 1104 by subdividing the element into hexahedra. As described above, the extended AGAR algorithm step 115 (FIG. 1A) can be used to implement methods that extend the hexahedra-based AGAR scheme to also include triangular prisms, such as those shown in FIGS. 10-13. For extruded triangle and quadrilateral meshes, that combination is sufficient. Assuming a consistent extruded topology, the paradigms discussed above with reference to FIGS. 10-13 will result in a valid mesh even if some of the elements are degenerate. FIGS. 14 and 15 show how certain embodiments can directly extend the single U-direction paradigm to non-triangular prisms, utilizing a mid-point subdivision algorithm. For non-triangular prisms, such as non-triangular prism 1004 of FIG. 14, the anisotropy may be maintained in the U-W space 1002. As can be seen in refinement 1104 of FIG. 14, using this refinement algorithm, the non-hexahedral prismatic elements 1004 are subdivided into hexahedra. Since hexahedra have three logical dimensions, compared to the two shown in FIGS. 14 and 15 for the non-hexahedral prismatic elements, the opportunity for anisotropic refinement is increased after the refinement of the original element.

To generalize further, a mid-point subdivision algorithm may be applied for all convex polyhedral cells, including non-extruded cells. Note that this would change the refinement algorithm for triangular prisms from that discussed above with reference to FIGS. 10-13. However, for the non-extruded cells, a single dimensional U space may be used by dropping the anisotropic refinements for these general cells. In cases where the majority of cells are extruded (hexahedral cells or other prismatic cells), the anisotropy for those cells will still provide a significant advantage over fully isotropic refinement. Further, anisotropic refinement on a regular cell neighboring an irregular cell does not violate the conformal requirement on the mesh. The irregular neighbor cell's polygonal face is simply divided.

Figure 16:
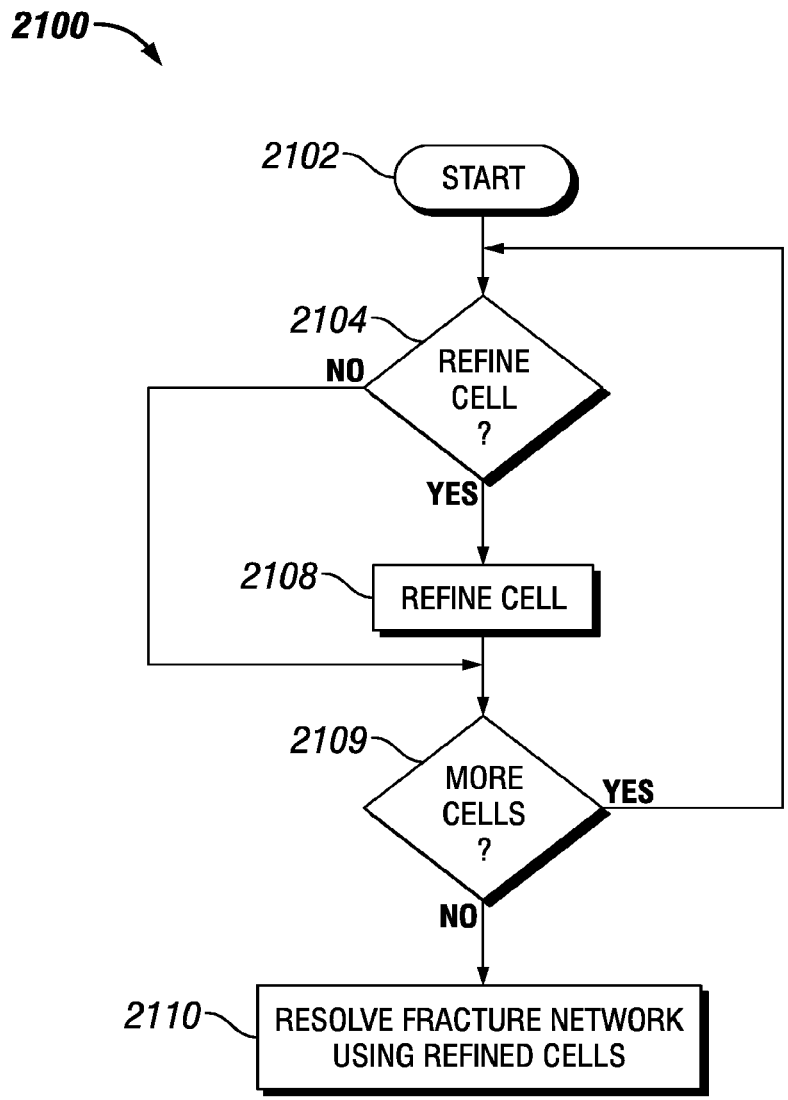
FIGS. 16 and 17 are flowcharts illustrating a process for extended anisotropic, geometry-adaptive cell refinement, according to FIG. 1A and certain illustrative examples of the present disclosure.

In view of the foregoing detailed description, one illustrative process for step 115 of FIG. 1A will now be described with reference to the flow charts of FIGS. 16 and 17. Referring to FIG. 16, process 2100 begins at block 2102. In one example, block 2102 includes data from unstructured extruded reservoir model 230. At block 2104, a cell in unstructured extruded reservoir model 230 may be analyzed to determine whether the cell in a mesh should be anisotropically refined (i.e., refined in any particular direction in 3D space). If it is determined that the cell being analyzed does not require refinement, control is passed to block 2109. At block 2109, it is determined if there are other cells to be analyzed. If there are no other cells to be analyzed, control is passed to block 2110. Otherwise, if it is determined that there is another cell remaining to be analyzed, control is passed back to block 2104 where that cell will then be analyzed to determine if refinement may be necessary.

If, at block 2104, it is determined that the cell requires refinement, the algorithm moves onto block 2108 where that cell is refined. As previously described, gradation and intersection rules may be employed to determine whether a cell should be refined. Once the cell is refined in all directions determined to be necessary, the algorithm proceeds onto block 2109 where a determination is made as to whether there are other cells to be analyzed. The process repeats until all ells have been analyzed. Upon completion of analysis of all cells, at block 2110, the fracture network within the reservoir model is resolved using the refined cells. The resulting refined reservoir model will possess a higher level of mesh resolution in those areas surrounding the fractures (e.g., near-fracture areas and the fractures), and lower mesh resolution in those non-near-fracture areas.

Figure 17:
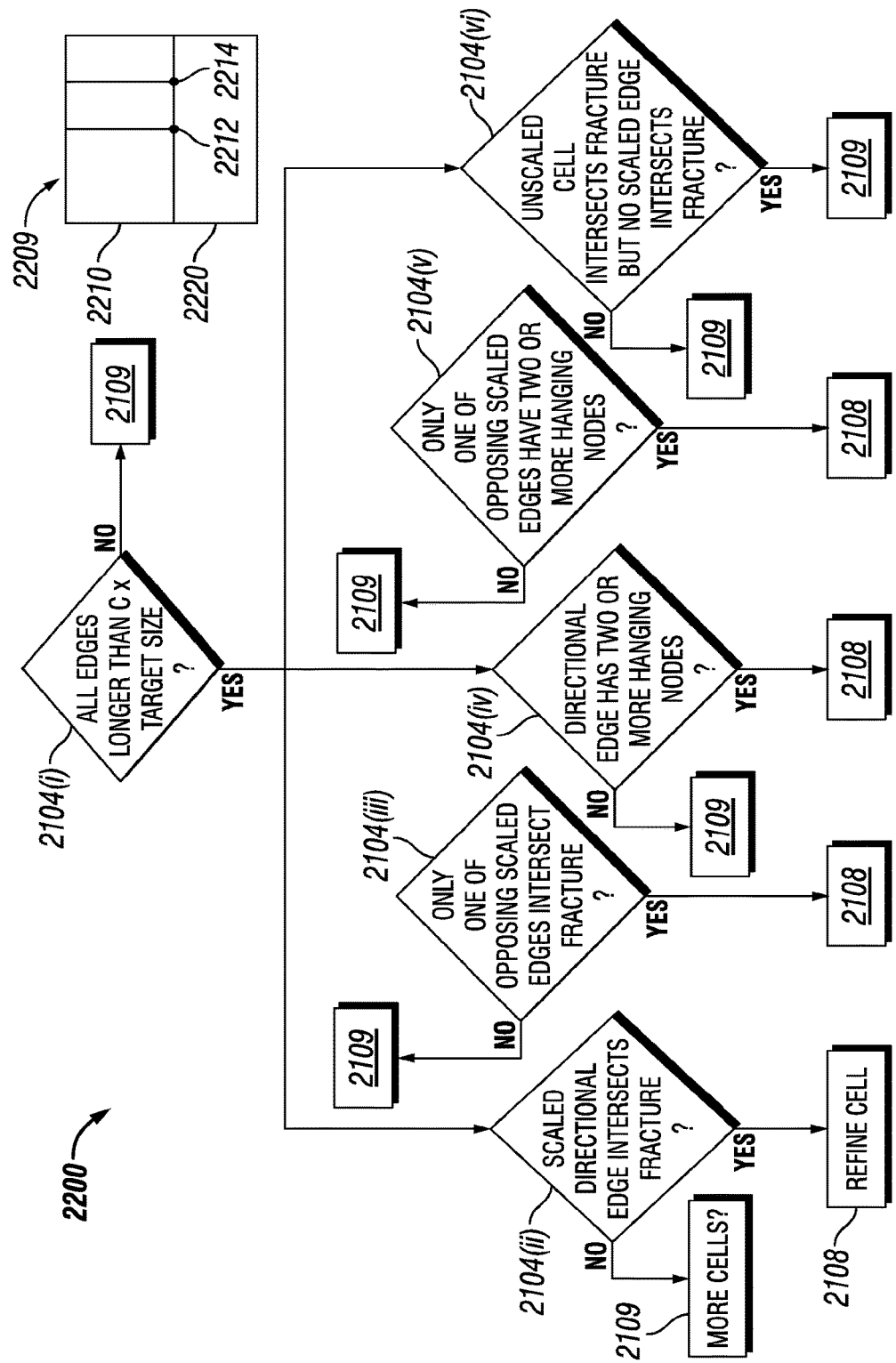

FIG. 17 is a flow chart of an illustrative refining process 2200 used in block 2104 of FIG. 16. The location of fractures within the fracture system is known based upon the fracture data 220 (FIG. 1A). Using this data, along with the gradation and intersection rules previously described, those cells in the near-fracture regions of the model that require refinement may be located. For those cells requiring refinement, all edges (and, thus, the cells) may be split in half in each refinement direction. The newly created cells will then be analyzed again in the next iteration, thereby ultimately increasing the mesh resolution. The resulting high resolution mesh provides more accurate numerical results in the near-fracture/fracture regions. The C×TargetSize (e.g., where C=√2) may be determined as previously described.

At block 2104(i), it may be determined whether all edges in the U-V-W directions for the cell (each direction is analyzed separately) are longer than C×TargetSize. If none of the edges are longer than C×TargetSize, no refinement is required, and control is passed to block 2109. If, however, one or more edges are longer than C×TargetSize, the five rules described above can then applied. At this point, at blocks 2104(ii)-(vi), it may be determined if one or more of the following are met: ii) a scaled directional edge intersects a fracture; iii) for any opposing pair of edges in the 3D direction, exactly one of the two scaled edges intersect a fracture; iv) a directional edge has two or more 'hanging' nodes; v) for any opposing pair of edges in the 3D direction, exactly one of the two edges has two or more hanging nodes; and vi) the un-scaled cell intersect a fracture but no scaled edge of the cell intersects a fracture.

At block 2104(ii), it may be determined if the scaled version of the cell has an edge in the analyzed direction that intersects a fracture. At block 2104(iii), an opposing pair of edges in a given direction may be analyzed to determine if only one of the scaled edges intersects a fracture. At block 2104(iv), it may be determined if an edge in the analyzed direction has two or more hanging nodes. In FIG. 17, element 2209 is provided as an illustration of this principle. Element 2209 is described below.

As shown in FIG. 17, element 2209 includes two adjacent cell faces 2210 and 2220 (shown in 2D for simplicity) having two nodes 2212 and 2214 positioned between them. In the example of element 2209, the first refinement would have split cell 2210 in half using node 2212. The second refinement would have split one of the new cells in half using node 2214. Therefore, nodes 2212 and 2214 are hanging with respect to cell 2220 because, although cell 2210 has been refined (in a previous iteration), cell 2220 has not been refined. Since cell 2220 has at least two hanging nodes, it will also be refined in subsequent iterations.

At block 2104(v) of process 2200, opposing edge pairs in the analyzed direction may be reviewed to determine whether only one of the edges has two or more hanging nodes. At block 2104(vi), it may be determined whether an un-scaled cell intersects a fracture but no scaled edge of the cell intersects a fracture.

If the determination is affirmative to any of the five rules described above with reference to blocks 2104(i-v), process 2200 passes control to block 2108 where that cell is refined. Otherwise, if the determination is negative with respect to all of the five rules, control is passed to block 2109. This process will continue iteratively until each cell in the model has been analyzed, as discussed above with respect to FIG. 16.

Referring now to FIG. 1B, in addition to creating refined reservoir mesh 235, method 100 includes the creation of a mesh for the fracture system. The fracture mesh may be represented as a volumetric mesh or a surface mesh with a thickness (aperture) property. In some instances, the fracture data may be initially provided as a discretized surface. If this surface is discretized with sufficient resolution for simulation, it may be used directly, in conjunction with a provided aperture value. In other cases, the surfaces will need to be meshed or refined to achieve the desired resolution.

Accordingly, an appropriate fracture surface mesh 240 may be constructed from fracture data at step 120. For fractures 220 already defined as a surface mesh, that mesh may be used as-is, or refinement or coarsening algorithms may be employed at step 120 to create the desired resolution. At step 125, each element of fracture surface fracture mesh 240 may then be thickened by a fracture aperture value to form fracture volume mesh 245.

Although typically the volume of the fracture network in fracture mesh 245 will not be a significant fraction of any reservoir cell in refined reservoir mesh 235, at this point how much fracture volume is located inside any given reservoir cell may be determined. If desired, the reservoir properties of refined reservoir mesh 235 can be modified at step 130 to account for the volume that is present in fracture volume mesh 245. Because the refined reservoir and fracture meshes 235, 245 will overlap, as discussed hereafter, the pore volume in refined reservoir mesh 235 can reduced to account for the volume now represented by the overlapping fracture volume mesh 245. In other words, the volumes of the matrix blocks surrounding the fractures in refined reservoir mesh 235 may be modified at step 130 to maintain the correct pore volume by removing pore volume from matrix control volumes that connect with fractures, thereby resulting in intermediate reservoir mesh 250. The amount of pore volume removed depends on the number and size of fractures to which the matrix control volume is connected.

Fracture mesh 245 and intermediate reservoir mesh 250 define two discreet volumetric meshes that overlap in space. Referring now to FIG. 1C, according to one or more embodiments, method 100 includes combining fracture volume mesh 245 with intermediate reservoir mesh 250 to form a final reservoir model 260. At step 135, three distinct sets of connections between fracture volume mesh 245 and intermediate reservoir mesh 250 are formed: Matrix-matrix connections, fracture-fracture connections, and matrix-fracture connections.

A first set connections, matrix-matrix connections, may be formed at step 135a between adjacent cell pairs in intermediate reservoir mesh 250. Such connections may be calculated in a standard way using two-point flux approximations (TPFA), multi-point flux approximations (MPFA), or other approximations. The TPFA scheme uses the pressure potential at the centers of two adjacent cells for computing the flow between said cells. The MPFA scheme additionally uses the pressure potential from all the neighboring cells of two adjacent cells to compute the flow between cell pairs. With orthogonal grids (the grid may be orthogonal relative to the permeability field—often referred to as "k-orthogonal"), the TPFA scheme may be sufficiently accurate. However for non-orthogonal grids, as is often the case with unstructured grids, the TPFA scheme becomes less accurate, and the MPFA scheme may be preferred to maintain accuracy.

A second set of connections, fracture-fracture connections, may be formed at step 135b between adjacent cell pairs in fracture volume mesh 245. In one or more embodiments, a control volume finite-difference discretization technique using a two-point flux approximation may be used. For both single- and multi-phase flow, the material balance for each control volume requires the knowledge of neighboring control volumes—a connectivity list—and the flow rate associated with each connection, which may be determined using the transmissibility for a fractured porous medium, as described below.

For any control-volume shape and problem dimension, the flow rate may be given as:

$$Q_{12} = T_{12} \lambda (p_2 - p_1) \quad \text{(Eq. 1)}$$

where p is pressure, $Q_{12}$ is the flow rate from cell 1 to cell 2, $T_{12}$ is the geometric part of the transmissibility, and $\lambda$ represents the fluid mobility using upstream information. In the case of multiphase flow, different flow rates, pressures, and mobilities are applicable for each phase. The mobility component of the transmissibility, which is different for each phase, may be computed in the usual way.

The geometric component of the transmissibility, $T_{12}$, which is the same for each phase may be expressed as:

$$T_{12} = \frac{\alpha_1 \alpha_2}{\alpha_1 + \alpha_2} \quad \text{with } \alpha_i = \frac{A_i k_i}{D_i} n_i \cdot f_i, \quad \text{(Eq. 2)}$$

where, $A_i$ is the area of the interface between two control volumes (using information from $CV_i$, where $CV_i$ designates the ith control volume), $k_i$ is the permeability of $CV_i$, $D_i$ is the distance between the centroid of the interface and the centroid of $CV_i$, $n_i$ is the unit vector normal to the interface inside $CV_i$, and $f_i$ is the unit vector along the direction of the line joining the control volume centroid to the centroid of the interface. All of the geometrical information needed to compute $T_{12}$ is defined in the grid domain. The above transmissibility calculation may be used directly for either 2D or 3D problems. In a 2D configuration, the interface is a segment, while in a 3D configuration the interface is a polygon.

The numerical connection between two fractures may be accomplished through use of an intermediate control volume ($CV_0$). The purpose of this intermediate control volume is to allow for flow redirection and thickness variation between the two fractures. However, in one or more embodiments, it may be advantageous not to introduce $CV_0$, and its associated unknowns, into the numerical model, as an intermediate control volume may introduce numerical problems because of the small size of $CV_0$ relative to the control volumes of the two cells, $CV_1$ and $CV_2$. The transmissibility between $CV_1$ and $CV_2$ may be expressed, while implicitly accounting for the intermediate control volume $CV_0$, as follows:

$$T_{12} = \frac{T_{10} T_{02}}{T_{10} + T_{02}} \quad \text{(Eq. 3)}$$

where $T_{10}$ is the transmissibility between $CV_1$ and $CV_0$ and $T_{02}$ is the transmissibility between $CV_0$ and $CV_2$. Accordingly, $T_{12}$ is simply a harmonic average of $T_{10}$ and $T_{02}$, which is appropriate for cells in series.

The definition of $T_{12}$ requires knowledge of $T_{10}$ and $T_{02}$, which necessitates a geometrical definition of the intermediate control volume. In order to avoid introducing this geometrical definition, which may be complex in some configurations, the following simplification may be possible. Because the size of the intermediate control volume is generally small compared to the adjacent control volumes, and the intermediate control volume is typically characterized by a similar permeability to that of the surrounding fracture control volumes, it may be assumed that:

$$\left. \begin{array}{l} D_1 >> D_0 \\ k_1 \approx k_0 \end{array} \right\} \Rightarrow \alpha_1 << \alpha_0 \Rightarrow T_{10} \approx \alpha_1 \quad \text{(Eq. 4)}$$

Similarly, it may be assumed that $T_{02} \approx \alpha_2$. Therefore, $T_{12}$ may be approximated by:

$$T_{12} \approx \frac{\alpha_1 \alpha_2}{\alpha_1 + \alpha_2} \quad \text{with } \alpha_i = \frac{A_i k_i}{D_i}, \quad \text{(Eq. 5)}$$

where $A_i$ is the fracture aperture, and the other variables are as defined above. In this configuration, $n_i \cdot f_i = 1$.

The above 1D technique may be extend for establishing fracture-fracture connections between two coplanar 2D objects intersecting in 3D space. An intermediate control volume may be introduced to connect the 2D objects to allow expression of the transmissibility between two control volumes with different thicknesses and orientations. Moreover, because the intermediate control volume has a relatively small size and nearly the same permeability as the surrounding control volumes the simplifications introduced above apply. Accordingly, the definition of the transmissibility from Equation 2 above may be used, noting that $n_i$, $f_i$, and $CV_i$ are coplanar. The variable $A_i$ is the area of the interface between $CV_i$ and $CV_0$, which is l×$e_i$, where l is the length of the interface calculated in the grid domain, and the variable $e_i$ is the thickness of $CV_i$.

With respect to establishing a connection between three 1D objects, an intermediate control volume $CV_0$ may be introduced for flow redirection and thickness adjustment between the different branches. The approximation of Equation 4 above may be applied to simplify the transmissibility between $CV_0$ and the surrounding control volumes ($T_{10}=\alpha_1$, $T_{20}=\alpha_2$, and $T_{30}=\alpha_3$). But, because of the three-way connectivity, it is not possible to remove the intermediate control volume by simply using a harmonic mean, as for the case of 1D/1D and 2D/2D connections. Rather, the connection may be modeled by analogy between flow through porous media and conductance through a wye network of resistors. A wye-delta transformation borrowed from electrical engineering may be employed to eliminate an intermediate three-way control volume $CV_0$ and allow the harmonic mean simplification provided by Equation 4. Thus, the transmissibility between $CV_i$ and $CV_j$, with i, j=1, 2, 3 (without using the intersection control volume), may be expressed as:

$$T_{12} = \frac{T_{10}T_{20}}{T_{10}+T_{20}+T_{30}} \approx \frac{\alpha_1\alpha_2}{\alpha_1+\alpha_2+\alpha_3} \quad \text{(Eq. 6)}$$

$$T_{13} = \frac{T_{10}T_{30}}{T_{10}+T_{20}+T_{30}} \approx \frac{\alpha_1\alpha_3}{\alpha_1+\alpha_2+\alpha_3}$$

$$T_{23} = \frac{T_{20}T_{30}}{T_{10}+T_{20}+T_{30}} \approx \frac{\alpha_2\alpha_3}{\alpha_1+\alpha_2+\alpha_3}.$$

For an intersection with n connections, Equation 6 can be generalized as $$T_{ij} \approx \frac{\alpha_i\alpha_j}{\sum_{k=1}^{n}\alpha_k}. \quad \text{(Eq. 7)}$$

The above transformations maybe applied using only information contained in the connectivity list and may be applied to 3D problems to eliminate all intersection control volumes. It should be noted that the above transformations are for cells not forming the boundary elements of the reservoir volume. Additionally, connections should be established for nearby but disconnected fractures accounting for the fracture rock that would be involved in such flow. Connections should be created between fractures that are close relative to the grid size in the reservoir of that region to ensure that small gaps in the fracture network do not force the flow to be routed through large reservoir blocks.

Finally, according to step 135c, a third set of connections, matrix-fracture connections, may be formed between cells of fracture volume mesh 245 and cells of intermediate reservoir mesh 250 to create a final model 260 for simulation. Fracture mesh 245 and intermediate reservoir mesh 250 define two discreet volumetric meshes that overlap in space. Intersections (i.e., geographically intersecting faces) of reservoir mesh cells with fracture mesh cells are first determined.

In one or more embodiments, a standard two-point flux approximation for computing transmissibility $t_i$ across a face for some cell, $C_i$, may be computed as follows:

$$t_i = \frac{A_i k_i (c_i \cdot f_i)}{d_i}, \quad \text{(Eq. 8)}$$

where $A_i$ is the area of the face, $k_i$ is the permeability of the cell, $c_i$ is the direction between the cell and face centroid, $f_i$ is the normal for the face, and $d_i$ is the distance between the cell and face centroids. The harmonic average may then be taken to determine the transmissibility between the two cells. For $C_{mat}$, a reservoir (matrix) mesh cell, and $C_{frac}$, a fracture mesh cell, the transmissibility between the two faces may be given as:

$$T_{mat,frac} = \frac{t_{mat}t_{frac}}{t_{mat}+t_{frac}}. \quad \text{(Eq. 9)}$$

In one or more embodiments, Equation 9 may be used directly to generate matrix-fracture connections. However, in one or more embodiments, matrix-fracture connections may be more accurately generated as follows:

The fracture cell, $C_{frac}$, was originally a face that was then thickened in step 125 (FIG. 1B) to have an aperture width Ap; that original face is referred to as $F_{orig}$. For small values of aperture Ap, the primary flow will be from the two faces extruded from $F_{orig}$, but only a portion of the original face may be in $C_{mat}$. Thus, we let $F_{inter}$ be the intersection of $C_{mat}$ and $F_{orig}$. The fracture area $A_{frac}$ can then be assumed to be twice the area of $F_{inter}$ (i.e., $A_{frac}=2\|F_{inter}\|$). It follows, then, that:

$$t_{frac} = \frac{4 \cdot \|F_{inter}\| \cdot k_{frac}}{Ap}. \quad \text{(Eq. 10)}$$

To avoid small variations in the fractures position relative to the reservoir cell centroid having great impact on the flow between the two cell, it may be preferable to not simply compute the centroid differences between the reservoir (matrix) cell centroid and the face centroid, geometrically. Letting $$\tilde{d}_{mat} = \frac{d_{mat}}{c_{mat} \cdot f_{mat}}$$

denote a representative distance between the matrix cell and the fracture faces through which the flow is modeled, only an appropriate value for $\tilde{d}_{mat}$ is needed to solve for $t_{mat}$, and thus $T_{mat,frac}$:

$$t_{mat} = \frac{2 \cdot \|F_{inter}\| \cdot k_{mat}}{\tilde{d}_{mat}}. \quad \text{(Eq. 11)}$$

In one or more embodiments, an initial value for $\tilde{d}_{mat}$ may be given by the following conceptual model:

$$\tilde{d}_{mat} = \frac{\|l_{seg}\|}{4} \quad \text{(Eq. 12)}$$

where l is a line passing through the centroid of $C_{mat}$ along the direction of the face normal, and the line segment $l_{seg}$ is determined by:

$$l_{seg} = C_{mat} \cap l \quad \text{(Eq. 13)}$$

However, computational experiments and comparisons may also be used to determine the appropriate equation, correlation, or refinement for $\tilde{d}_{mat}$.

Figure 18:
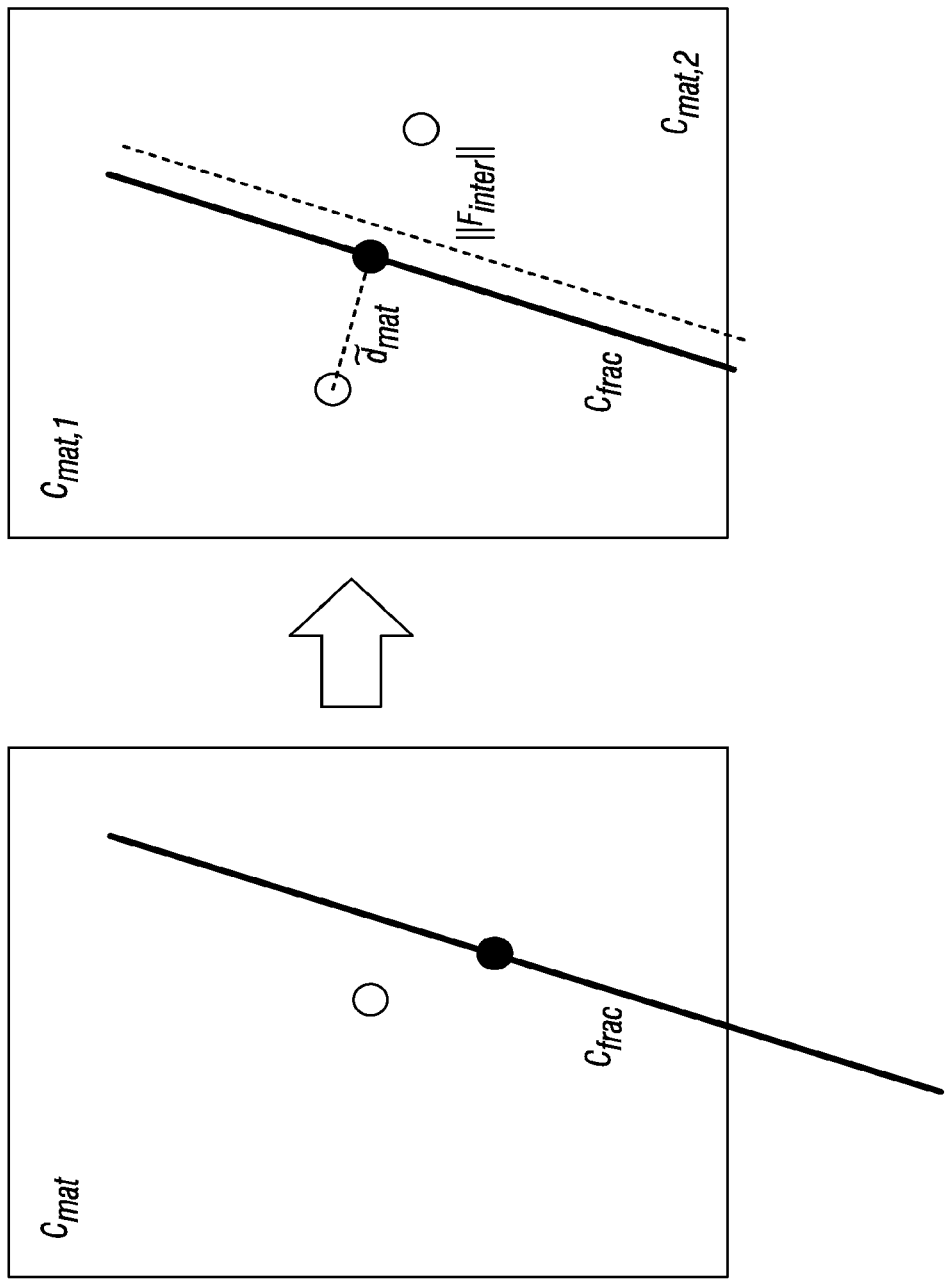
FIG. 18 is a 2D schematic illustration of a scheme for generating reservoir-fracture mesh connections according to FIG. 1C and certain illustrative examples of the present disclosure.

FIG. 18 is a 2D schematic of the foregoing interpretation of $\tilde{d}_{mat}$. The representative distance from the reservoir (matrix) cell to the fracture faces is computed assuming the fracture was at the centroid and flow needed to traverse a quarter of the cell going in either direction.

Figure 19A:
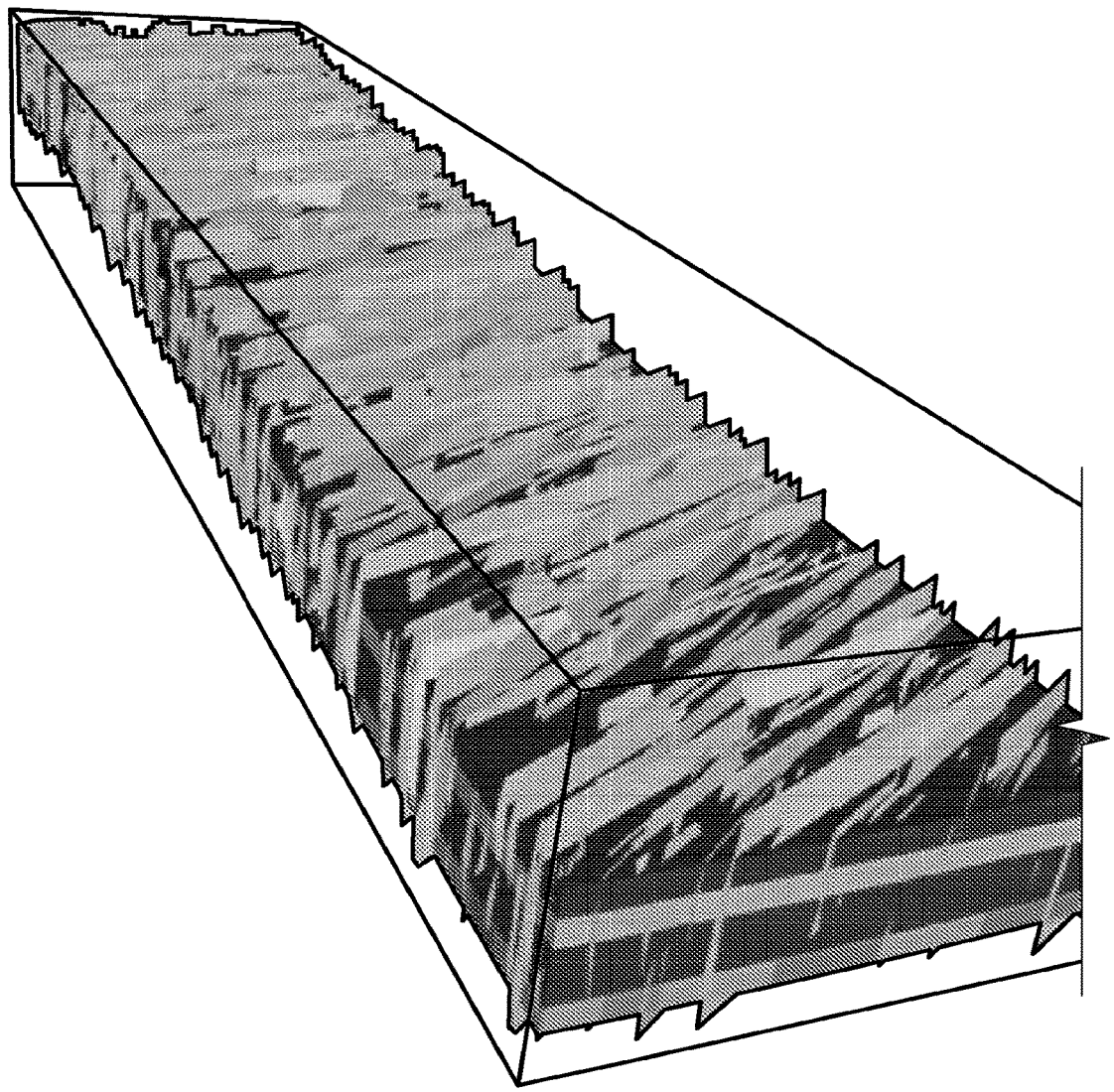
FIGS. 19A-19C illustrate an exemplary natural fracture mesh that has been processed in accordance with the method of FIGS. 1A-1C according to an embodiment.
Figure 19B:
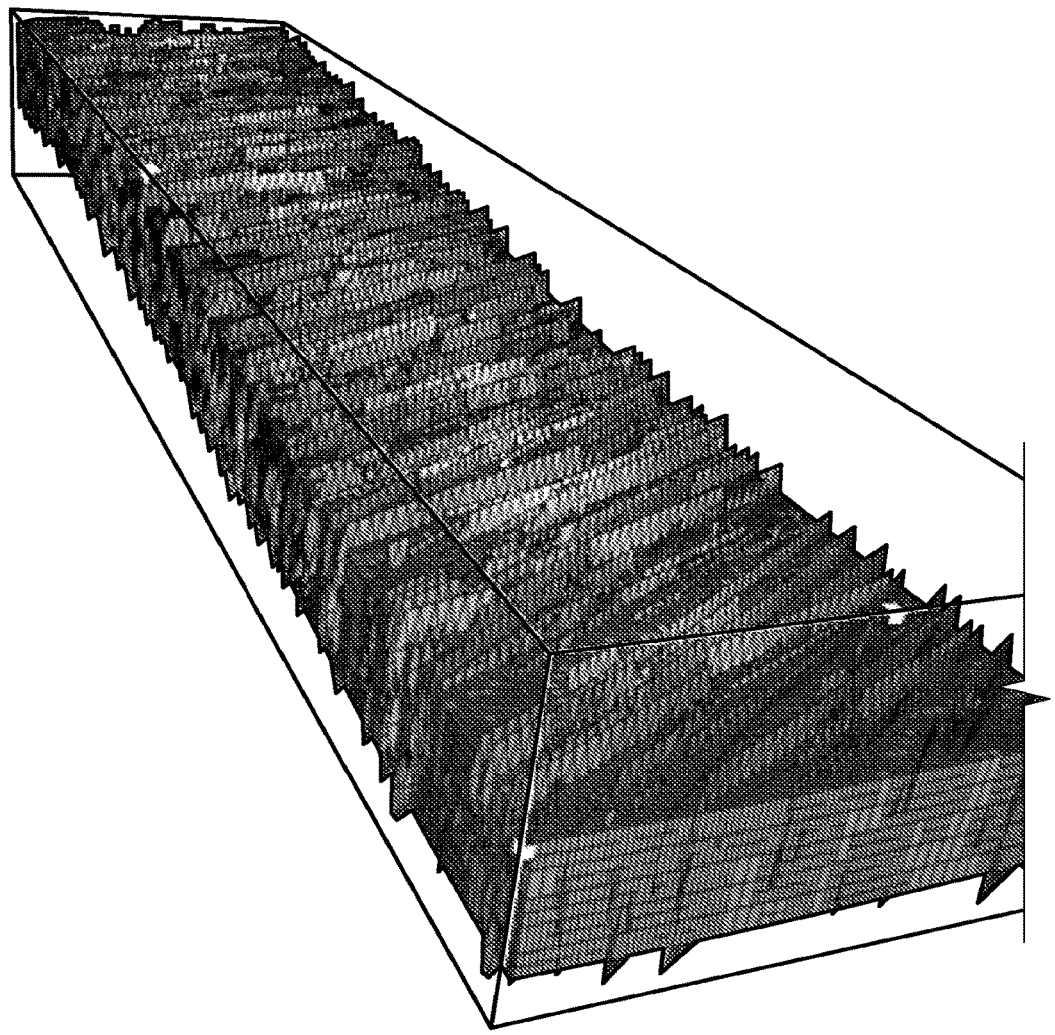
Figure 19C:
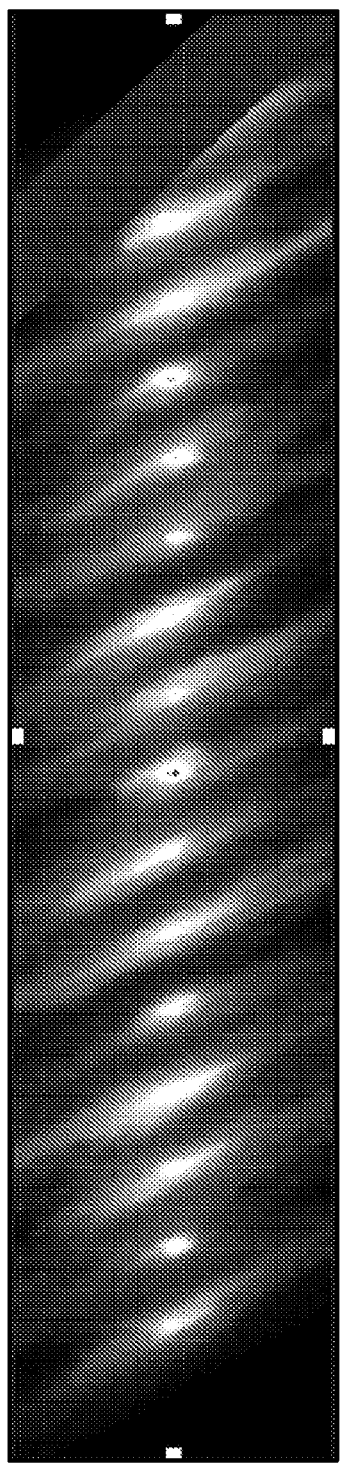
Figure 20:
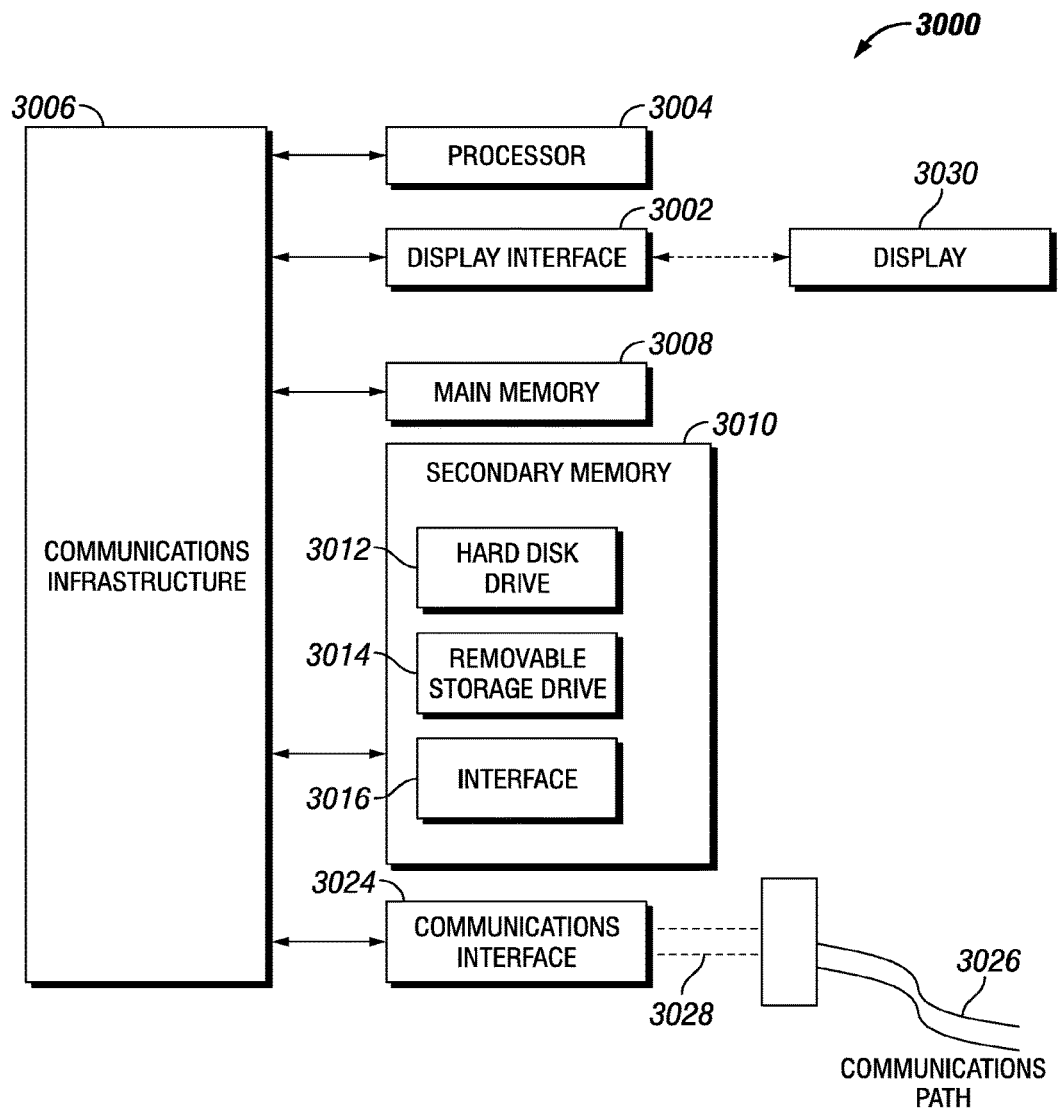
FIG. 20 is a functional block diagram of an exemplary computer system according to an embodiment in which the method of FIGS. 1A-1C may be implemented.

FIGS. 19A-19C illustrate an exemplary natural fracture mesh that has been processed in accordance with method 100 (FIGS. 1A-1C) described above, except that no 2.5D meshing of step 110 was performed in this specific example. The model was simulated using commercially available Nexus® Reservoir Simulation Software. FIG. 19A is a perspective view of a natural fracture network, FIG. 19B is a perspective view of the processed mesh in accordance with method 100, and FIG. 19C is a horizontal cross section of FIG. 19B. Shading of FIGS. 19B and 19C is indicative of the pressure field. In one or more embodiments, the fracture network may be trimmed (not illustrated) to avoid fractures extending outside of the reservoir being modeled.

Examples of embodiments have been described in terms of apparatuses, systems, services, and methods. However, certain aspects of the disclosed embodiments may be embodied in software that is executed using one or more processing units/components. Program aspects of the technology may be considered as "products" or "articles of manufacture" typically in the form of executable code and/or associated data that is carried on or embodied in a type of machine readable medium. This, to implement the various features and functions described above, some or all elements of the systems and methods may be, in one or more embodiments, implemented using elements of the computer system 3000 of FIG. 19. Computer system 3000 is operable to manipulate or transform content data represented as physical electronic or magnetic quantities within memories, registers, or other information storage devices, transmission devices, or display devices of the computing platform. Computer system 3000 may include hardware, software, firmware, non-transitory computer readable media having logic or instructions stored thereon, or a combination thereof. Any suitable programming, scripting, or other type of language or combinations of languages may be used to implement method 100 in software to be executed by computer system 3000. Throughout this specification, disclosure using terms such as "processing," "computing," "calculating," "determining," "generating," "identifying," or the like may refer to actions or processes of computing computer system 3000. Computer system 3000, as disclosed herein, is not limited to any particular hardware architecture or configuration.

In particular, computer hardware, software, or any combination of such may embody certain modules and components used to implement method 100 illustrated by FIGS. 1A-1C discussed above. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter. If programmable logic is used, such logic may execute on a commercially available processing platform or a special purpose device. Embodiments of the disclosed subject matter may be implemented by various computer system configurations, including multi-core multiprocessor systems, minicomputers, mainframe computers, computers linked or clustered with distributed functions, as well as pervasive or miniature computers that may be embedded into virtually any device.

Referring now to FIG. 19, computer system 300 may include a processor device 3004. Processor device 3004 may be a special purpose or a general purpose processor device and may include digital circuitry such as microprocessors, microcontrollers, field-programmable gate arrays, digital-to-analog converters, analog-to-digital converters, buffers, latches, memory, drivers, multiplexors, universal asynchronous receivers/transmitters, and the like. Discrete electronic components may be combined in one or more application-specific integrated circuits (ASICs) as appropriate. Processor device 3004 may be a single processor in a multi-core/multiprocessor system, such system operating alone, or in a cluster of computing devices operating in a cluster or server farm. Processor device 3004 may be connected to a communication infrastructure 3006, for example, a bus, message queue, network, or multi-core message-passing scheme.

Computer system 3000 may also include a main memory 3008 and a secondary memory 3010. Main memory 3008 may include volatile memory, for example, random access memory (RAM), that temporarily stores software instructions and data for execution and or manipulation by processor device 3004. Secondary memory 3010 may include, for example, non-volatile memory such as Flash memory or electrically erasable programmable read-only memory (EEPROM), a hard disk drive 3012, and/or removable storage 3014 for storing persistent software code and data. Software code and data may be transferred between secondary memory 3010 and main memory 3008 as necessary. Removable storage drive 3014 may include magnetic or optical storage media, Flash memory, or the like. Removable storage 3014 may include a non-transitory computer software and/or data.

Computer system 3000 may also include a communications interface 3024. Communications interface 3024 allows software and data to be transferred between computer system 3000 and one or more external devices or communications networks (not illustrated). For example, communications interface 3024 may enable computer system 3000 receive user input (e.g., from a keyboard and mouse) and output information to one or more devices such as, but not limited to, printers, external data storage devices, and audio speakers. A computer display 3030 of computer system 3000 may be implemented as a conventional or touch sensitive display (i.e., a touch screen). The computer display 3030 may connect to communications infrastructure via display interface 3002 to display received electronic content. For example, the computer display 3030 can be used to display input models and refined fractures. Display interface 3002 may include instructions or hardware (e.g., a graphics card or chip) for providing enhanced graphics, touch screen, and/or multi-touch functionalities associated with computer display 3030.

Communications interface 3024 may include a network interface card and/or a wireless transceiver, for example. Software and data transferred via communications interface 3024 may be in the form of signals, which may be electronic, electromagnetic, optical, or other signals capable of being received by communications interface 3024. These signals may be provided to communications interface 3024 via a communications path 3026. Communications path 3026 carries signals and may be implemented using wire or cable, fiber optics, a phone line, a cellular phone link, a radio-frequency (RF) link or other communications channels. The communications network may be any type of network including a combination of one or more of the following networks: A wide area network, a local area network, one or more private networks, the Internet, a telephone network such as the public switched telephone network (PSTN), one or more cellular networks, and wireless data networks. The communications network may include a plurality of network nodes such as routers, network access points/gateways, switches, domain name service (DNS) servers, proxy servers, and other network nodes for assisting in routing of data/communications between devices.

In one or more embodiments, computer system 3000 may interact with one or more database servers (not illustrated) for performing method 100 (FIGS. 1A-1C). Computer system 3000 may query a database for geological information for assigning reservoir properties to cells for performing a simulation. For instance, computer system 3000 may query a database for well log information for determining fracture orientation or density for enabling modeling of the fractures in accordance with the disclosed embodiments. Further, in certain embodiments, computer system 3000 may act as a server system for one or more client devices or a peer system for peer to peer communications or parallel processing with one or more devices.

In summary, a method, system, and computer readable storage medium with executable instructions to model three-dimensional geological fractures within a reservoir have been described. Embodiments of the method to model three-dimensional geological fractures within a reservoir may generally include: Generating a volumetric matrix mesh of the reservoir; generating a volumetric fracture mesh of the geological fractures; establishing matrix-matrix connections within the matrix mesh; establishing fracture-fracture connections within the fracture mesh; and establishing matrix-fracture connections between the matrix and fracture volume meshes. Embodiments of the system to model three-dimensional geological fractures within a reservoir may generally have: A processor; and a memory having instructions stored thereon, that, if executed by the processor, cause the processor to perform operations comprising, generating a volumetric matrix mesh of the reservoir, generating a volumetric fracture mesh of the geological fractures, establishing matrix-matrix connections within the matrix mesh, establishing fracture-fracture connections within the fracture mesh, and establishing matrix-fracture connections between the matrix and fracture volume meshes. Embodiments of the computer readable storage medium with executable instructions to model three-dimensional geological fractures within a reservoir may generally have instructions including: Generating a volumetric matrix mesh of the reservoir; generating a volumetric fracture mesh of the geological fractures; establishing matrix-matrix connections within the matrix mesh; establishing fracture-fracture connections within the fracture mesh; and establishing matrix-fracture connections between the matrix and fracture volume meshes.

Any of the foregoing embodiments may include any one of the following elements or characteristics, alone or in combination with each other: The matrix mesh is orthogonal; the establishing matrix-matrix connections further comprises discretizing using two-point flux approximations of pressure potential between adjacent cells in the matrix mesh; the matrix mesh includes non-orthogonal cells; the establishing matrix-matrix connections further comprises discretizing using multi-point flux approximations of pressure potential of all neighboring cells of adjacent cells in the matrix mesh; approximating a transmissibility between adjacent cells in the fracture mesh; determining a flow rate between the adjacent cells using the transmissibility; discretizing using a two-point or multi-point flux approximations of the flow rate; determining geographical intersecting faces between cells of the matrix mesh and cells of the fracture mesh; for each intersecting face, calculating a matrix transmissibility value at the face of the matrix mesh, calculating a fracture transmissibility value at the face of the fracture mesh, and calculating a transmissibility across the face between the matrix mesh and the fracture mesh as a harmonic average of the matrix and fracture transmissibility values; calculating the matrix transmissibility value using a two-point flux approximation; calculating the fracture transmissibility value using a two-point flux approximation; the generating a volumetric fracture mesh includes extruding an original face of each cell within a surface fracture mesh by a corresponding aperture width; the establishing matrix-fracture connections further comprises, for each face, calculating the fracture and matrix transmissibility values as functions of the intersection of the corresponding original face of the surface fracture mesh with the face of the matrix mesh; for each face, calculating the fracture and matrix transmissibility values as functions of the intersection of the corresponding original face of the surface fracture mesh with the face of the matrix mesh; determining a representative distance between the centroid of a cell in the matrix mesh and the intersecting face of the cell; calculating the matrix transmissibility value for the face of the cell as a function of the representative distance; receiving a reservoir specification; identifying, based on the reservoir specification, a set of fractures including 2.5-dimensional-permitting fractures and other fractures; generating an unstructured reservoir model including an extrusion mesh which models the 2.5-dimensional-permitting fractures in three-dimensions; anisotropically refining one or more cells in the unstructured reservoir model corresponding to the other fractures; resolving a fracture network within the unstructured reservoir model using the refined cells; generating a refined reservoir model using the fracture network; the 2.5-dimensional-permitting fractures have geometry that has been discretized in a two-dimensional plane by a collection of line segments; for each line segment associated with each fracture in the 2.5D-permitting fractures, generating a set of stadia at a specified radii from the line segment, generating closed loops around the line segment, and generating shape elements within the closed loops of the line segment; generating the mesh as a constrained mesh around closed loops of the 2.5D-permitting fractures to fill in a remainder space of the two-dimensional plane; identifying a direction within the three dimensions in which the cells should be refined; splitting an edge of the cells, the edge being in the direction within the three dimensions; and the method to model three-dimensional geological fractures within the reservoir is performed by a computer system.

The Abstract of the disclosure is solely for providing the a way by which to determine quickly from a cursory reading the nature and gist of technical disclosure, and it represents solely one or more embodiments.

While various embodiments have been illustrated in detail, the disclosure is not limited to the embodiments shown. Modifications and adaptations of the above embodiments may occur to those skilled in the art. Such modifications and adaptations are in the spirit and scope of the disclosure.

What is claimed is:

1. A method to model three-dimensional geological fractures within a reservoir, comprising:
   identifying a set of fractures within the reservoir, based on a reservoir specification, the set of fractures including 2.5-dimensional (2.5D)-permitting fractures, the 2.5D-permitting fractures having a geometry that has been discretized in a two-dimensional plane by a collection of line segments;
   for each line segment associated with each fracture in the 2.5D-permitting fractures:
      generating a set of stadia at specified radii from the line segment;
      generating closed loops around the line segment; and
      generating shape elements within the closed loops of the line segment;
   generating a volumetric matrix mesh of said reservoir as a constrained mesh around the closed loops of the 2.5D-permitting fractures to fill in a remainder space of the two-dimensional plane;
   generating a volumetric fracture mesh of said geological fractures;
   establishing matrix-matrix connections within said matrix mesh;
   establishing fracture-fracture connections within said fracture mesh; and
   establishing matrix-fracture connections between said matrix and fracture meshes.

2. The method of claim 1 wherein:
   said matrix mesh is orthogonal; and
   said establishing matrix-matrix connections further comprises discretizing using two-point flux approximations of pressure potential between adjacent cells in said matrix mesh.

3. The method of claim 1 wherein:
   said matrix mesh includes non-orthogonal cells; and
   said establishing matrix-matrix connections further comprises discretizing using multi-point flux approximations of pressure potential of all neighboring cells of adjacent cells in said matrix mesh.

4. The method of claim 1 wherein said establishing fracture-fracture connections further comprises:
   approximating a transmissibility between adjacent cells in said fracture mesh;
   determining a flow rate between said adjacent cells using said transmissibility; and
   discretizing using a two-point or multi-point flux approximations of said flow rate.

5. The method of claim 1 wherein said establishing matrix-fracture connections further comprises:
   determining geographical intersecting faces between cells of said matrix mesh and cells of said fracture mesh;
   for each intersecting face, calculating a matrix transmissibility value at the face of said matrix mesh, calculating a fracture transmissibility value at the face of said fracture mesh, and calculating a transmissibility across the face between said matrix mesh and said fracture mesh as a harmonic average of said matrix and fracture transmissibility values;
   calculating the matrix transmissibility value using a two-point flux approximation; and
   calculating the fracture transmissibility value using a two-point flux approximation,
   wherein generating a volumetric fracture mesh includes extruding an original face of each cell within a surface fracture mesh by a corresponding aperture width, and establishing matrix-fracture connections further comprises, for each face, calculating the fracture and matrix transmissibility values as functions of the intersection of the corresponding original face of the surface fracture mesh with the face of the matrix mesh.

6. The method of claim 5, wherein said establishing matrix-fracture connections further comprises:
   for each face, calculating said fracture and matrix transmissibility values as functions of the intersection of the corresponding original face of said surface fracture mesh with the face of said matrix mesh;
   determining a representative distance between the centroid of a cell in the matrix mesh and the intersecting face of the cell; and
   calculating the matrix transmissibility value for the face of the cell as a function of the representative distance.

7. The method of claim 1, wherein the set of fractures further includes other fractures in addition to the 2.5D-permitting fractures, and said generating said volumetric matrix mesh further comprises:
   generating an unstructured reservoir model including an extrusion mesh which models the 2.5D-permitting fractures in three-dimensions;
   anisotropically refining one or more cells in the unstructured reservoir model corresponding to the other fractures, by:
      identifying a direction within the three dimensions in which the cells should be refined; and
      splitting an edge of the cells, the edge being in the direction within the three dimensions;
   resolving a fracture network within the unstructured reservoir model using the refined cells; and
   generating a refined reservoir model using the fracture network.

8. A non-transitory computer readable storage medium having executable instructions stored thereon, that, if executed by a computing device, cause the computing device to perform operations comprising:
   identifying a set of fractures within the reservoir, based on a reservoir specification, the set of fractures including 2.5-dimensional (2.5D)-permitting fractures, the 2.5D-permitting fractures having a geometry that has been discretized in a two-dimensional plane by a collection of line segments;
   for each line segment associated with each fracture in the 2.5D-permitting fractures:
      generating a set of stadia at specified radii from the line segment;
      generating closed loops around the line segment; and
      generating shape elements within the closed loops of the line segment;
   generating a volumetric matrix mesh of said reservoir as a constrained mesh around the closed loops of the 2.5D-permitting fractures to fill in a remainder space of the two-dimensional plane;
   generating a volumetric fracture mesh of said geological fractures;
   establishing matrix-matrix connections within said matrix mesh;
   establishing fracture-fracture connections within said fracture mesh; and
   establishing matrix-fracture connections between said matrix and fracture meshes.

9. The non-transitory computer readable storage medium of claim 8 wherein:
said matrix mesh is orthogonal; and
said instructions further comprise discretizing using two-point flux approximations of pressure potential between adjacent cells in said matrix mesh to establish said matrix-matrix connections.

10. The non-transitory computer readable storage medium of claim 8 wherein:
said matrix mesh includes non-orthogonal cells; and
said instructions further comprise discretizing using multi-point flux approximations of pressure potential of all neighboring cells of adjacent cells in said matrix mesh to establish said matrix-matrix connections.

11. The non-transitory computer readable storage medium of claim 8 wherein said operations further comprise:
approximating a transmissibility between adjacent cells in said fracture mesh;
determining a flow rate between said adjacent cells using said transmissibility; and
discretizing using a two-point or multi-point flux approximations of said flow rate.

12. The non-transitory computer readable storage medium of claim 8 wherein said operations further comprise:
determining geographical intersecting faces between cells of said matrix mesh and cells of said fracture mesh;
for each intersecting face, calculating a matrix transmissibility value at the face of said matrix mesh, calculating a fracture transmissibility value at the face of said fracture mesh, and calculating a transmissibility across the face between said matrix mesh and said fracture mesh as a harmonic average of said matrix and fracture transmissibility values;
calculating the matrix transmissibility value using a two-point flux approximation; and
calculating the fracture transmissibility value using a two-point flux approximation,
wherein generating a volumetric fracture mesh includes extruding an original face of each cell within a surface fracture mesh by a corresponding aperture width, and establishing matrix-fracture connections further comprises, for each face, calculating the fracture and matrix transmissibility values as functions of the intersection of the corresponding original face of the surface fracture mesh with the face of the matrix mesh.

13. The non-transitory computer readable storage medium of claim 12, wherein said operations further comprise:
for each face, calculating said fracture and matrix transmissibility values as functions of the intersection of the corresponding original face of said surface fracture mesh with the face of said matrix mesh;
determining a representative distance between the centroid of a cell in the matrix mesh and the intersecting face of the cell; and
calculating the matrix transmissibility value for the face of the cell as a function of the representative distance.

14. The non-transitory computer readable storage medium of claim 8 wherein the set of fractures further includes other fractures in addition to the 2.5D-permitting fractures, and said operations further comprise:
generating an unstructured reservoir model including an extrusion mesh which models the 2.5D-permitting fractures in three-dimensions;
anisotropically refining one or more cells in the unstructured reservoir model corresponding to the other fractures, by:
identifying a direction within the three dimensions in which the cells should be refined; and
splitting an edge of the cells, the edge being in the direction within the three dimensions;
resolving a fracture network within the unstructured reservoir model using the refined cells; and
generating a refined reservoir model using the fracture network.

15. A system to model three-dimensional geological fractures within a reservoir, comprising:
a processor; and
a memory having instructions stored thereon, that, if executed by the processor, cause the processor to perform operations comprising:
identifying a set of fractures within the reservoir, based on a reservoir specification, the set of fractures including 2.5-dimensional (2.5D)-permitting fractures, the 2.5D-permitting fractures having a geometry that has been discretized in a two-dimensional plane by a collection of line segments;
for each line segment associated with each fracture in the 2.5D-permitting fractures:
generating a set of stadia at specified radii from the line segment;
generating closed loops around the line segment; and
generating shape elements within the closed loops of the line segment;
generating a volumetric matrix mesh of said reservoir as a constrained mesh around the closed loops of the 2.5D-permitting fractures to fill in a remainder space of the two-dimensional plane;
generating a volumetric fracture mesh of said geological fractures;
establishing matrix-matrix connections within said matrix mesh;
establishing fracture-fracture connections within said fracture mesh; and
establishing matrix-fracture connections between said matrix and fracture meshes.

16. The system of claim 15 wherein:
said matrix mesh is orthogonal; and
said instructions further comprise discretizing using two-point flux approximations of pressure potential between adjacent cells in said matrix mesh to establish said matrix-matrix connections.

17. The system of claim 15 wherein:
said matrix mesh includes non-orthogonal cells; and
said instructions further comprise discretizing using multi-point flux approximations of pressure potential of all neighboring cells of adjacent cells in said matrix mesh to establish said matrix-matrix connections.

18. The system of claim 15 wherein said operations further comprise:
approximating a transmissibility between adjacent cells in said fracture mesh;
determining a flow rate between said adjacent cells using said transmissibility; and
discretizing using a two-point or multi-point flux approximations of said flow rate.

* * * * *